US010220836B2

(12) United States Patent
Honda et al.

(10) Patent No.: US 10,220,836 B2
(45) Date of Patent: Mar. 5, 2019

(54) VEHICLE

(71) Applicant: HONDA MOTOR CO., LTD., Tokyo (JP)

(72) Inventors: Tomokazu Honda, Wako (JP); Hitoshi Sasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 268 days.

(21) Appl. No.: 15/119,853

(22) PCT Filed: Feb. 19, 2016

(86) PCT No.: PCT/JP2016/054783
§ 371 (c)(1),
(2) Date: Aug. 18, 2016

(87) PCT Pub. No.: WO2016/133182
PCT Pub. Date: Aug. 25, 2016

(65) Prior Publication Data
US 2016/0362102 A1 Dec. 15, 2016

(30) Foreign Application Priority Data
Feb. 19, 2015 (JP) .................................. 2015-031114

(51) Int. Cl.
B60W 30/045 (2012.01)
B60K 23/08 (2006.01)
(Continued)

(52) U.S. Cl.
CPC ............. B60W 30/045 (2013.01); B60K 1/02 (2013.01); B60K 6/442 (2013.01); B60K 6/52 (2013.01);
(Continued)

(58) Field of Classification Search
CPC .......... B60K 1/02; B60K 35/00; B60K 6/365; B60K 17/35; B60K 23/08; B60T 8/1755;
(Continued)

(56) References Cited

U.S. PATENT DOCUMENTS 5,731,669 A 3/1998 Shimizu et al.
6,549,840 B1 * 4/2003 Mikami ................. B60K 6/365
701/69

(Continued)

FOREIGN PATENT DOCUMENTS

CN 102448786 A 5/2012
DE 102011017464 A1 10/2012
(Continued)

OTHER PUBLICATIONS

Notice of Allowance dated Dec. 19, 2016, issued in U.S. Appl. No. 15/112,893. (19 pages).
(Continued)

Primary Examiner — Yuri Kan
(74) Attorney, Agent, or Firm — Westerman, Hattori, Daniels & Adrian, LLP

(57) ABSTRACT

A drive control device of the vehicle controls a left and right driving force difference by a driving device based on a rotational velocity of a rotary electric machine, which imparts a steering force or a steering additive force to a steering system of the vehicle. Furthermore, at a time that there is a deviation or a likelihood of a deviation of the vehicle with respect to a travel path or when an avoidance assistance unit produces a notifying operation or imparts a deviation avoidance assistance steeling force or a deviation avoidance assistance steering additive force, the drive control device prohibits or suppresses control of the left and right driving force difference based on the rotational velocity.

6 Claims, 11 Drawing Sheets

(51) Int. Cl.

| | | |
|---|---|---|
| *B60W 30/02* | (2012.01) | |
| *G06F 7/00* | (2006.01) | |
| *B60W 10/20* | (2006.01) | |
| *A01B 69/00* | (2006.01) | |
| *B60K 1/02* | (2006.01) | |
| *B60K 6/442* | (2007.10) | |
| *B60K 6/54* | (2007.10) | |
| *B62D 6/00* | (2006.01) | |
| *B60W 10/08* | (2006.01) | |
| *B60W 10/16* | (2012.01) | |
| *B62D 11/04* | (2006.01) | |
| *B62D 15/02* | (2006.01) | |
| *B60K 6/52* | (2007.10) | |
| *B60W 20/15* | (2016.01) | |
| *B60K 7/00* | (2006.01) | |
| *B60K 17/356* | (2006.01) | |
| *B60K 23/04* | (2006.01) | |
| *B60L 11/12* | (2006.01) | |
| *B60L 15/20* | (2006.01) | |
| *B60W 20/00* | (2016.01) | |
| *B60K 5/04* | (2006.01) | |
| *B60K 5/00* | (2006.01) | |

(52) U.S. Cl.
CPC ............ *B60K 6/54* (2013.01); *B60K 7/0007* (2013.01); *B60K 17/356* (2013.01); *B60K 23/04* (2013.01); *B60K 23/0808* (2013.01); *B60L 11/12* (2013.01); *B60L 15/2036* (2013.01); *B60W 10/08* (2013.01); *B60W 10/16* (2013.01); *B60W 10/20* (2013.01); *B60W 20/15* (2016.01); *B62D 6/00* (2013.01); *B62D 11/04* (2013.01); *B62D 15/025* (2013.01); *B60K 5/04* (2013.01); *B60K 2005/003* (2013.01); *B60K 2023/043* (2013.01); *B60K 2023/0833* (2013.01); *B60L 2240/12* (2013.01); *B60L 2240/18* (2013.01); *B60L 2240/22* (2013.01); *B60L 2240/24* (2013.01); *B60L 2240/423* (2013.01); *B60L 2250/26* (2013.01); *B60W 20/00* (2013.01); *B60W 2510/081* (2013.01); *B60W 2520/10* (2013.01); *B60W 2520/125* (2013.01); *B60W 2540/18* (2013.01); *B60W 2720/406* (2013.01); *Y02T 10/6234* (2013.01); *Y02T 10/6265* (2013.01); *Y02T 10/7258* (2013.01)

(58) Field of Classification Search
CPC ... B60T 8/17558; B60W 30/02; B60W 10/20; B60W 30/045; A01B 69/00; G06F 7/00
See application file for complete search history.

(56) References Cited

U.S. PATENT DOCUMENTS

| | | | |
|---|---|---|---|
| 7,778,753 B2* | 8/2010 | Fujiwara | B60T 8/17558 340/435 |
| 8,355,841 B2* | 1/2013 | Takahashi | B60K 35/00 340/438 |
| 8,740,747 B2 | 6/2014 | Tabata et al. | |
| 9,233,674 B2* | 1/2016 | Futamura | B60T 8/1755 |
| 2002/0010538 A1 | 1/2002 | Uchida | |
| 2005/0080532 A1 | 4/2005 | Kato et al. | |
| 2005/0217921 A1 | 10/2005 | Mori et al. | |
| 2006/0086543 A1 | 4/2006 | Motoyama | |
| 2006/0091727 A1 | 5/2006 | Motoyama | |
| 2006/0196714 A1 | 9/2006 | Sugimoto et al. | |
| 2010/0228444 A1* | 9/2010 | Kojo | B60T 8/1755 701/42 |
| 2012/0015772 A1 | 1/2012 | Kira et al. | |
| 2013/0006476 A1 | 1/2013 | Yamazaki | |
| 2013/0035831 A1* | 2/2013 | Nozu | B60K 17/35 701/69 |
| 2013/0190986 A1 | 7/2013 | Nishimori | |
| 2014/0156127 A1 | 6/2014 | Ebert et al. | |

FOREIGN PATENT DOCUMENTS

| | | |
|---|---|---|
| EP | 0754588 A1 | 1/1997 |
| EP | 2497679 A2 | 9/2012 |
| EP | 2623386 A1 | 8/2013 |
| JP | 4-129837 A | 4/1992 |
| JP | 9-89076 A | 3/1997 |
| JP | 10-16599 A | 1/1998 |
| JP | 2000-190863 A | 7/2000 |
| JP | 2002-29400 A | 1/2002 |
| JP | 2005-112285 A | 4/2005 |
| JP | 2005-137063 A | 5/2005 |
| JP | 2005-160262 A | 6/2005 |
| JP | 2005-219580 A | 8/2005 |
| JP | 2005-253175 A | 9/2005 |
| JP | 2005-289160 A | 10/2005 |
| JP | 2006-44293 A | 2/2006 |
| JP | 2006-117177 A | 5/2006 |
| JP | 2006-158149 A | 6/2006 |
| JP | 2007-269095 A | 10/2007 |
| JP | 2008-74328 A | 4/2008 |
| JP | 2008-100590 A | 5/2008 |
| JP | 2008-222055 A | 9/2008 |
| JP | 2008-222070 A | 9/2008 |
| JP | 2010-52523 A | 3/2010 |
| JP | 2010-52525 A | 3/2010 |
| JP | 2010-58691 A | 3/2010 |
| JP | 2010-101333 A | 5/2010 |
| JP | 2010-208366 A | 9/2010 |
| JP | 2011-131618 A | 7/2011 |
| JP | 2011-163518 A | 8/2011 |
| JP | 2012-166715 A | 9/2012 |
| JP | 2013-56636 A | 3/2013 |
| JP | 2014-101086 A | 6/2014 |
| JP | 2014-139039 A | 7/2014 |
| WO | 2007/063397 A1 | 6/2007 |
| WO | 2012/043683 A1 | 4/2012 |
| WO | 2014/115234 A1 | 7/2014 |
| WO | 2015/178119 A1 | 11/2015 |

OTHER PUBLICATIONS

International Search Report dated Apr. 26, 2016, issued in counterpart International Application No. PCT/JP2016/054783 in Japanese (4 pages).
International Search Report dated Apr. 12, 2016, issued in International Application No. PCT/JP2016/054786 of co-pending U.S. Appl. No. 15/112,893 in Japanese (4 pages).
International Search Report dated Oct. 28, 2014, issued in International Application No. PCT/JP2014/069998 of co-pending U.S. Appl. No. 14/440,419 (3 pages).
Rejection of the Application dated Dec. 15, 2015, issued in counterpart Japanese Patent Application No. 2015-031112 of co-pending U.S. Appl. No. 14/440,419, w/English translation (4 pages).
Related co-pending application: U.S. Appl. No. 14/440,419.
Related co-pending application: U.S. Appl. No. 15/112,893.
Non Final Office Action dated Feb. 9, 2017, issued in related U.S. Appl. No. 14/440,419 (20 pages).
Chinese Office Action and Search Report dated Apr. 20, 2017, issued in Chinese Patent Application No. 201480043314.8 with Machine and partial English Translations. (22 pages).
EP Office Action dated January Jan. 22, 2018, issued in EP Application No. 14832005.04 (8 pages).
Extended (supplementary) European Search Report dated Jul. 18, 2018, issued in related application No. 16752570.8 (11pages).
European Search Report dated Feb. 9, 2017, issued in application No. 14832005.4.

(56) References Cited

OTHER PUBLICATIONS

Extended European Search Report dated Dec. 13, 2018, issued in counterpart application No. 16752568.2. (10 pages).

* cited by examiner

VEHICLE

TECHNICAL FIELD

The present invention relates to a vehicle that is capable of adjusting a driving force of left and right drive wheels.

BACKGROUND ART

In Japanese Laid-Open Patent Publication No. 10-016599 (hereinafter referred to as "JP10-016599A"), a steering wheel angular velocity dθh (or a steering angular velocity dθh) is calculated based on a steering wheel angle (or a steering angle) that is detected by a steering wheel angle sensor 48B, and a steering transient response control is performed on the basis of the steering wheel angular velocity dθh (see FIG. 6, and paragraphs [0149] through [0154]). According to the steering transient response control, a torque transfer control (paragraph [0117]) based on a lateral acceleration applied to the vehicle during turning is enabled responsive to the steering angular velocity dθh (paragraph [0150]). Stated otherwise, according to JP10-016599A, transmission of motive power between the left and right wheels is controlled based on the steering angular velocity dθh (see paragraph [0001]).

According to Japanese Laid-Open Patent Publication No. 2013-056636 (hereinafter referred to as "JP2013-056636A"), a vibrational torque is imparted in left and right directions to a steering wheel 2 when a vehicle deviates from a travel lane or it is predicted that the vehicle will deviate from the travel lane (Abstract). The vibrational torque is generated by operating a torque actuator of an electric power steering mechanism (see paragraph [10013]).

SUMMARY OF INVENTION

As described above, according to JP10-016599A, transmission of motive power between the left and right wheels is controlled based on the steering angular velocity dθh. However, with the technology of JP10-016599A, room remains for improvement in relation to a motive power transmission control (or a left and right wheel driving force difference) between the left and right wheels.

If the steering transient response control of JP10-016599A is used in a state where the vibrational torque is generated in JP2013-056636A, accompanying the vibrational torque, then the steering angular velocity dθh changes abruptly. In this case, in relation to the motive power transmission control (or the left and right wheel driving force difference) between the left and right wheels, there is a concern that a sense of unease or discomfort may be imparted to the driver.

The present invention has been devised taking into consideration the aforementioned problems, and has the object of providing a vehicle in which it is possible to improve attitude control or operational performance of the vehicle by suitably controlling the driving force difference of the left and right wheels during turning.

A vehicle according to the present invention is characterized by:

a driving device configured to control a left and right driving force difference, which is a difference between a left driving force and a right driving force, by controlling the left driving force and the right driving force, the left driving force being a driving force of a left wheel of the vehicle, the right driving force being a driving force of a right wheel of the vehicle;

a drive control device configured to control the driving device;

a rotary electric machine connected mechanically to steered wheels and configured to impart a steering force or a steering additive force to a steering system including the steered wheels; and a driving assistance device configured to assist avoidance of a deviation of the vehicle with respect to a travel path;

wherein the driving assistance device includes:

a travel path recognizing unit configured to recognize the travel path;

a deviation acquisition unit configured to acquire a deviation or a likelihood of a deviation of the vehicle with respect to the travel path; and an avoidance assistance unit configured to produce a notifying operation with respect to a steering input device of the steering system by driving the rotary electric machine or impart a deviation avoidance assistance steering force or a deviation avoidance assistance steering additive force with respect to the steering system, when the deviation acquisition unit has acquired the deviation or the likelihood of the deviation;

wherein the vehicle further includes a rotational velocity acquisition unit configured to acquire a rotational velocity of the rotary electric machine;

the drive control device controls the left and right driving force difference by the driving device, based on the rotational velocity; and furthermore, the drive control device prohibits or suppresses control of the left and right driving force difference based on the rotational velocity, when the deviation acquisition unit has acquired the deviation or the likelihood of the deviation, or when the avoidance assistance unit produces the notifying operation or imparts the deviation avoidance assistance steering force or the deviation avoidance assistance steering additive force.

The term "driving force" referred to herein, in addition to a torque [N·m] of the driven wheels, also is used with a meaning of a driving force [N] of the driven wheels that can be calculated from the torques of the driven wheels. Further, the term "difference between the left driving force and the right driving force" includes both the meaning of a difference between the left driving force and the right driving force, and a ratio between the left driving force and the right driving force. Furthermore, the term "acquiring" of the phrase "acquiring a rotational velocity" includes any of detecting, calculating, estimating, and predicting.

According to the present invention, in addition to steering of the steered wheels, a yaw moment of the vehicle is controlled using the left and right driving force difference. Further, the left and right driving force difference is controlled based on the rotational velocity of the rotary electric machine, which imparts a steering force or a steering additive force to the steering system of the vehicle. Therefore, by making it possible to set the left and right driving force difference in conjunction with the rotational velocity of the rotary electric machine, the yaw moment of the vehicle can be controlled appropriately.

Furthermore, according to the present invention, the left and right driving force difference is controlled using the rotational velocity of the rotary electric machine as a steering condition. Generally, the rotational velocity acquisition unit (in particular a detecting element thereof) that acquires the rotational velocity of the rotary electric machine is disposed closer to the side of the steered wheels than a steering angle acquisition unit. Stated otherwise, the steering angle acquisition unit performs detection at a position more distanced from the steered wheels in comparison with the rotational velocity acquisition unit. Furthermore, in other words, a distance of the steering angle acquisition unit from the steered wheels in the transmission path (steering force transmission path) of a steering torque that links the steering wheel and the steered wheels is farther than that of the rotational velocity acquisition unit.

In addition, in general, concerning the mounting of the steering angle acquisition unit (in particular, the detecting element thereof), which is arranged in the vicinity of the steering wheel, precision of the same degree as the mounting of the rotational velocity acquisition unit, which is done strictly for the purpose of controlling the rotary electric machine, is unasked. Concerning this point as well, in the steering angle acquisition unit, there is a possibility for errors to be more likely contained than in the rotational velocity acquisition unit.

From the above, concerning the relationship thereof with the actual steered angle in the steered wheels, in the steering angle acquisition unit, a phase delay occurs, and errors are more likely to be contained than with the rotational velocity acquisition unit. Conversely stated, concerning the relationship thereof with the actual steering angle in the steered wheels, in the rotational velocity acquisition unit, it is less likely for such phase delay and errors to be contained than with the steering angle acquisition unit. Consequently compared to the case in which the steering angular velocity is used, the left and right driving force difference can be controlled with higher responsiveness and higher accuracy. Accordingly, it is possible to improve the attitude control or the operational performance of the vehicle.

Further still, according to the present invention, a time that there is a deviation or a likelihood of a deviation of the vehicle with respect to the travel path, or when the avoidance assistance unit produces a notifying operation or imparts the deviation avoidance assistance steering force or the deviation avoidance assistance steering additive force, control of the left and right driving force difference based on the rotational velocity is prohibited or suppressed. Consequently, it is possible to prevent interference of the notifying operation or the deviation avoidance assistance steering force or the deviation avoidance assistance steering additive force with respect to the control of the left and right driving force difference on the basis of the rotational velocity, and it is possible for the control of the left and right driving force difference on the basis of the rotational velocity to coexist together with the notifying operation or the deviation avoidance assistance steering force or the deviation avoidance assistance steering additive force.

The steering system may include a steering amount acquisition unit configured to acquire a steering amount of a steering subject of the vehicle. The rotary electric machine may be arranged an a steering force transmission path more closely to the steered wheels than the steering amount acquisition unit, and the steering force or the steering additive force may be determined based on the steering amount. In accordance with the above, the left and right driving force difference is controlled based on the rotational velocity of the rotary electric machine, which is closer to the steered wheels than the steering amount acquisition unit. Consequently, compared to the case of controlling the left and right driving force difference based on the steering velocity, it is possible to control the left and right driving force difference with high responsiveness and high accuracy.

The driving device may include a left rotary electric machine connected mechanically to the left wheel, and a right rotary electric machine connected mechanically to the right wheel. In accordance therewith, the left and right driving force difference and a yaw moment of the vehicle involved with the left and right driving force difference can be controlled rapidly and precisely.

The drive control device may execute a steering amount proportional control configured to control the left and right driving force difference, based on the steering amount and a lateral acceleration of the vehicle. Further, the drive control device may control the left and right driving force difference by combining the control of the left and right driving force difference based on the rotational velocity and the steering amount proportional control. Furthermore, the drive control device may prohibit or suppress control of the left and right driving force difference based on the rotational velocity and continue the control of the left and right driving force difference by the steering amount proportional control, when the deviation acquisition unit has acquired the deviation or the likelihood of the deviation, or when the avoidance assistance unit produces the notifying operation or imparts the deviation avoidance assistance steering force or, the deviation avoidance assistance steering additive force. Consequently, even at a time that a deviation or the likelihood of a deviation of the vehicle with respect to the travel path exists, control of the left and right driving force difference can continue within a range that is not affected by the notifying operation.

The avoidance assistance unit may produce the notifying operation with respect to the steering input device of the steering system by driving the rotary electric machine, and thereafter, may impart the deviation avoidance assistance steering force or the deviation avoidance assistance steering additive force with respect to the steering system, when the deviation acquisition unit has acquired the deviation or the likelihood of the deviation. Furthermore, the drive control device may prohibit or suppress control of the left and right driving force difference based on the rotational velocity, when the deviation acquisition unit has acquired the deviation or the likelihood of the deviation, or when the avoidance assistance unit produces the notifying operation. Consequently, it is possible to reliably prohibit or suppress control of the left and right driving force difference based on the rotational velocity, prior to imparting the deviation avoidance assistance steering force or the deviation avoidance assistance steering additive force with respect to the steering system.

A vehicle according to the present invention is characterized by:

a driving device configured to control a torque of a left wheel and a torque of a right wheel, by controlling a left torque, which is a torque of a left rotary electric machine connected mechanically to the left wheel of the vehicle, and a right torque, which is a torque of a right rotary electric machine connected mechanically to the right wheel of the vehicle;

a drive control device configured to control the driving device;

a rotary electric machine connected mechanically to steered wheels and configured to impart a steering force or a steering additive force to a steering system including the steered wheels; and a driving assistance device configured to assist avoidance of a deviation of the vehicle with respect to a travel path;

wherein the driving assistance device includes an avoidance assistance unit configured to produce a notifying operation with respect to a steering input device of the steering system by driving the rotary electric machine or impart a deviation avoidance assistance steering force or a deviation avoidance assistance steering additive force with respect to the steering system, when there is a deviation or a likelihood of the deviation of the vehicle with respect to the travel path;

wherein the vehicle further includes a rotational velocity acquisition unit configured to acquire a rotational velocity of the rotary electric machine;

the drive control device controls the left torque and the right torque, based on the rotational velocity; and furthermore, the drive control device prohibits or suppresses control of the left torque and the right torque based on the rotational velocity, when there is the deviation or the likelihood of the deviation, or when the avoidance assistance unit produces the notifying operation or imparts the deviation avoidance assistance steering force or the deviation avoidance assistance steering additive force.

According to the present invention, in addition to steering of the steered wheels, a yaw moment of the vehicle is controlled using the left torque and the right torque. Further, the left torque, and the right torque are controlled based on the rotational velocity of the rotary electric machine, which imparts a steering force or a steering additive force to the steering system of the vehicle. Therefore, by making it possible to set the left torque and the right torque in conjunction with the rotational velocity of the rotary electric machine, the yaw moment of the vehicle can be controlled appropriately.

Furthermore, according to the present invention, at a time that there is a deviation or the likelihood of a deviation of the vehicle with respect to the travel path, or when the avoidance assistance unit produces a notifying operation or imparts the deviation avoidance assistance steering force or the deviation, avoidance assistance steering additive force, control of the left and right driving force difference based on the rotational velocity is prohibited or suppressed. Consequently, it is possible to prevent interference of the notifying operation with respect to the control of the left and right driving force difference on the basis of the rotational velocity, and it is possible for control of the left and right driving force difference based on the rotational velocity to coexist together with the notifying operation.

According to the present invention, it is possible to improve the attitude control or the operational performance of the vehicle during turning.

DESCRIPTION OF EMBODIMENTS

I. Embodiment

A. Configuration

A-1. Overall Configuration of Vehicle 10

Figure 1:
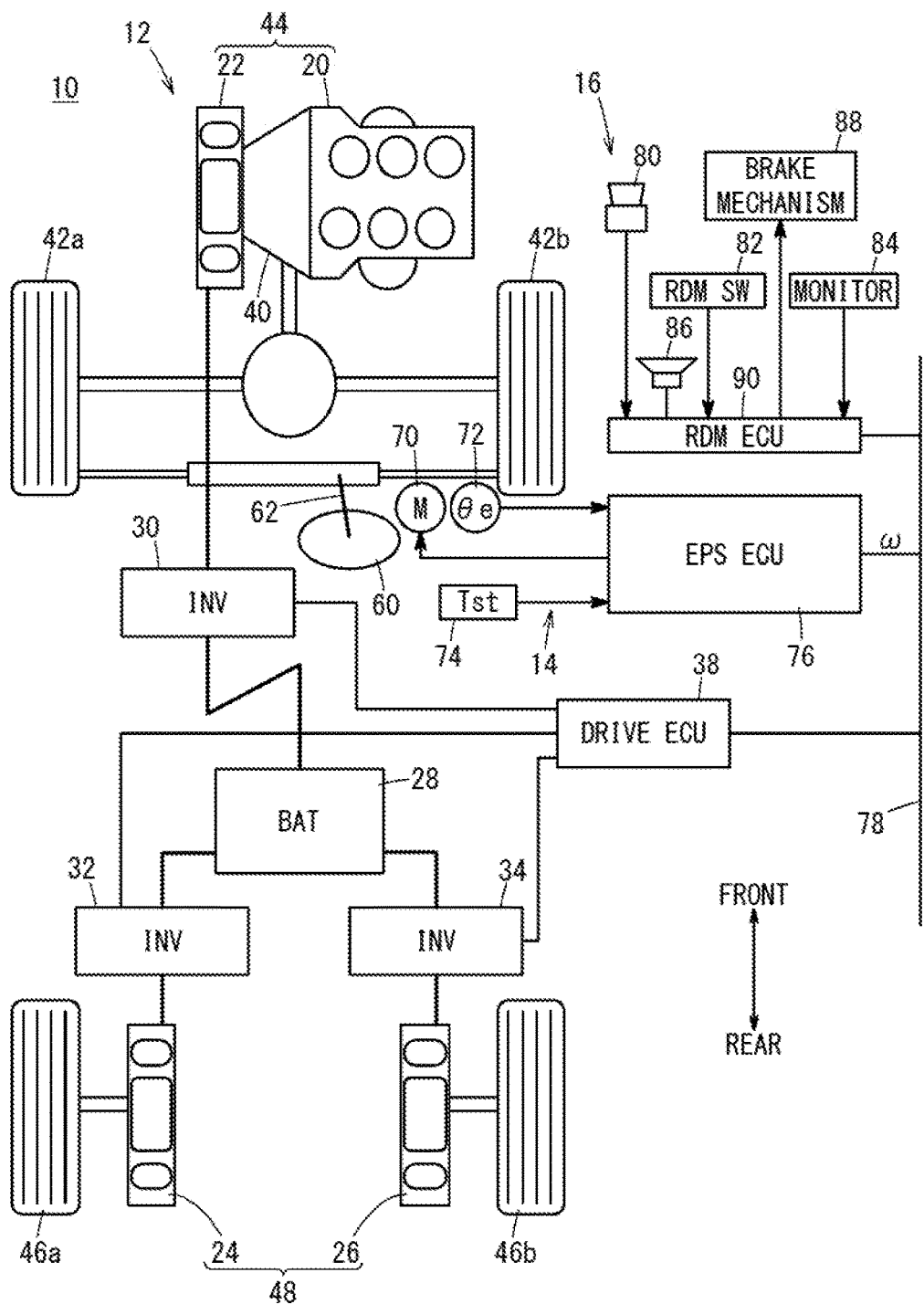
FIG. 1 is an outline schematic view of a portion of a vehicle according to an embodiment of the present invention.

FIG. 1 is an outline schematic drawing of a portion of a vehicle 10 according to an embodiment of the present invention. As shown in FIG. 1, the vehicle 10 includes a drive system 12, an electric power steering device 14 (hereinafter referred to as an "EPS device 14"), and a road deviation mitigation device 16 (hereinafter also referred to as an "RDM device 16").

A-2. Drive System 12

A-2-1. Overall Configuration of Drive System 12

Figure 2:
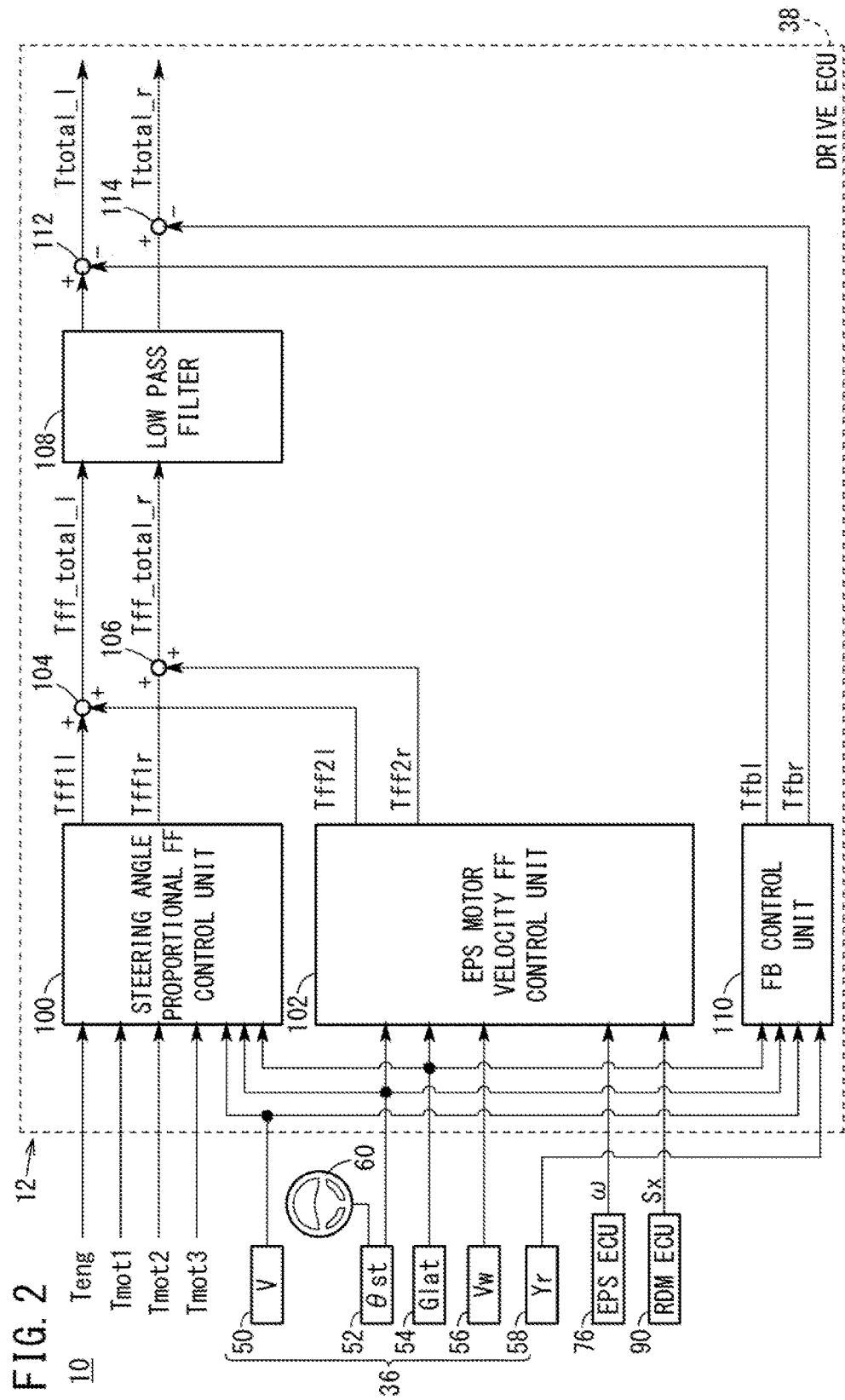
FIG. 2 is a block diagram showing a portion of a drive system of the vehicle according to the embodiment.

FIG. 2 is a block diagram showing a portion of a drive system 12 of the vehicle 10 according to the present embodiment. As shown in FIGS. 1 and 2, the drive system 12 includes an engine 20 and a first traction motor 22 arranged in series on a front side of the vehicle 10, a second traction motor 24 and a third traction motor 26 arranged on a rear side of the vehicle 10, a high voltage battery 28 (hereinafter also referred to as a "battery 28"), first through third inverters 30, 32, 34, a drive system sensor group 36 (FIG. 2), and a drive electronic control unit 38 (hereinafter referred to as a "drive ECU 38").

Below, the first traction motor 22 may also be referred to as a "first motor 22" or a "front side motor 22". Further, below, the second traction motor 24 may also be referred to as a "second motor 24" or a "left motor 24". Furthermore, below, the third traction motor 26 may also be referred to as a "third motor 26" or a "right motor 26".

A-2-2. Engine 20 and First Through Third Motors 22, 24, 26

The engine 20 and the first motor 22 transmit driving force (hereinafter referred to as a "front wheel driving force Ff") to the left front wheel 42a and the right front wheel 42b (hereinafter collectively referred to as "front wheels 42") through a transmission 40. The engine 20 and the first motor 22 constitute a front wheel driving device 44. For example, when the vehicle 10 is under a low load, driving is carried out only by the first motor 22, when under an intermediate load, driving is carried out only by the engine 20, and when under a high load, driving is carried out by the engine 20 and the first motor 22.

An output shaft of the second motor 24 is connected to the rotational shaft of the left rear wheel 46a, and transmits driving force to the left rear wheel 46a. An output shaft of the third motor 26 is connected to the rotational shaft of the right rear wheel 46b, and transmits driving force to the right rear wheel 46b. The second motor 24 and the third motor 26 constitute a rear wheel driving device 48. The front wheel driving device 44 and the rear wheel driving device 48 are not connected together mechanically and are disposed separately and independently. Below, the left rear wheel 46a and the right rear wheel 46b will be referred to collectively as rear wheels 46. Further, the driving force that is transmitted to the rear wheels 46 from the rear wheel driving device 48 will be referred to as a rear wheel driving force Fr.

Although the engine 20, for example, is a 6-cylinder 30, engine, it may be a 2-cylinder, a 4-cylinder, or an 8-cylinder engine, etc., or, another type of engine. Further, the engine 20 is not limited to a gasoline engine, but can be an engine such as a diesel engine, an air engine, or the like.

Although the first through third motors 22, 24, 26, for example, are 3-phase AC brushless motors, they may be 3-phase AC brush motors, single-phase AC motors, DC motors, or the like, or other types of motors. The specifications of the first through third motors 22, 24, 26 may be the same or different from each other. Any of the first through third motors 22, 24, 26 is capable of generating a torque in a forward direction (i.e., rotated in a direction to advance the vehicle 10) and a torque in a reverse direction (i.e. rotated in a direction to reverse the vehicle 10).

A-2-3. High Voltage Battery 28 and First Through Third Inverters 30, 32, 34

The high voltage battery 28 supplies electric power to the first through third motors 22, 24, 26 through the first through third inverters 30, 32, 34, and is charged with regenerative electric power Preg from the first through third motors 22, 24, 26.

The battery 28 is an electric power storage device (energy storage) including a plurality of battery cells, and for example, can make use of a lithium ion secondary battery, a nickel-hydrogen secondary battery, or the like. In the present embodiment, a lithium ion secondary battery is used. In addition to the battery 28 or instead of the battery 28, another energy storage device (such as a capacitor or the like) can be used. Moreover, unillustrated DC/DC converters may be disposed between the battery 28 and the first through third inverters 30, 32, 34, whereby the output voltage from the battery 28 or output voltage from the first through third motors 22, 24, 26 may be stepped-up or stepped-down.

The first through third inverters 30, 32, 34 are constituted as 3-phase full bridge inverters, and perform DC/AC conversion. More specifically, the first through third inverters 30, 32, 34 convert DC current into a 3-phase AC current, and supply the AC current to the first through third motors 22, 24, 26. Further, the first through third inverters 30, 32, 34 supply DC current to the battery 28, after AC/DC conversion has been performed accompanying a power-regenerative operation of the first through third motors 22, 24, 26.

A-2-4. Drive System Sensor Group 36

As shown in FIG. 2, in the drive system sensor group 36, there are included a vehicle velocity sensor 50, a steering angle sensor 52, a lateral acceleration sensor 54 (hereinafter referred to as a "lateral G sensor 54"), a wheel velocity sensor 56, and a yaw rate sensor 58.

The vehicle velocity sensor 50 detects the vehicle velocity V [km/h] of the vehicle 10. The steering angle sensor 52 detects a steering angle θst [deg] of the steering wheel 60 (steering input device). The lateral G sensor 54 detects a lateral acceleration Glat [m/s$^2$] applied to the vehicle 10 (vehicle body). The wheel velocity sensor 56 detects rotational velocities (hereinafter referred to as "wheel velocities Vwfl, Vwfr, Vwrl, Vwrr", and referred to collectively as "wheel velocities Vw") of the respective wheels 42a, 42b, 46a, 46b. The yaw rate sensor 58 detects a yaw rate Yr applied to the vehicle 1 (vehicle body).

A-2-5. Drive ECU 38

The drive ECU 38 controls the outputs from the engine 20 and the first through third motors 22, 24, 26, by controlling the engine 20 and the first through third inverters 30, 32, 34. The drive ECU 38 includes an input/output unit, a computation unit and a storage unit (neither of which are shown). Further, the drive ECU 38 may be constituted by a plurality of ECUs used in combination. For example, the drive ECU 38 may be constituted by plural ECUs corresponding respectively to the engine 20 and the first through third motors 22, 24, 26, and an ECU that manages the driven states of the engine 20 and the first through third motors 22, 24, 26. Further details concerning the drive ECU 38 will be discussed later.

A-3. EPS Device 14

The EPS device 14 carries out a steering assist control for assisting the operation by the driver to operate the steering wheel 60. As shown in FIG. 1, the EPS device 14 includes an electric power steering motor 70 (hereinafter referred to as an "EPS motor 70"), a resolver 72, a steering torque sensor 74, and an electric power steering electronic control unit 76 (hereinafter referred to as an "EPS ECU 76"). As the configuration of the EPS device 14, there can be used the configuration disclosed in, for example, U.S. Patent Application Publication No. 2013/0190986 (hereinafter referred to as "US2013/0190986A1") (for example, refer to FIG. 2 of the same publication).

The EPS motor 70 is a 3-phase brush less motor, which is connected to a steering shaft 62 through a worm gear and a worm wheel (neither of which are shown). In the steering assist control, the EPS motor 70 imparts a driving force (steering additive force Fad) to the steering shaft 62 responsive to commands from the EPS ECU 76. The steering additive force Fad is an assistive force in the same rotational direction as that applied to the steering wheel 60 by the driver. Alternatively, the steering additive force Fad may be applied as a reactive force in a direction opposite to the direction of rotation of the steering wheel 60 applied by the driver.

The EPS motor 70 of the present embodiment is arranged closer to the side of the front wheels 42a, 42b than the steering angle sensor 52. For example, the positional relationship is the same as that between the steering angle sensor 92 and the EPS motor 60 shown in FIG. 2 of US2013/0190986A1.

The resolver 72 (which is part of the rotational velocity acquisition unit) detects an electrical angle θe [deg] which is the angle of rotation of a non-illustrated output shaft or an external rotor of the EPS motor 70. The steering torque sensor 74 detects a torque Tst (hereinafter referred to as a "steering torque Tst") [N·m] that is input to the steering wheel 60 from the driver.

The EPS ECU 76 (which is part of the rotational velocity acquisition unit) controls the steering additive force Fad in the steering shaft 62, by controlling the EPS motor 70 based on the steering torque Tst and the yaw rate Yr, etc. The EPS ECU 76 includes an input/output unit, a computation unit and a storage unit (neither of which are shown). The EPS ECU 76 of the present embodiment calculates an EPS motor velocity ω [rad/sec] which is a time differential value of the electrical angle θe from the resolver 72. The EPS ECU 76 outputs the calculated EPS motor velocity ω to the drive ECU 38 through a communications line 78.

A-4. RDM Device 16

Figure 7:
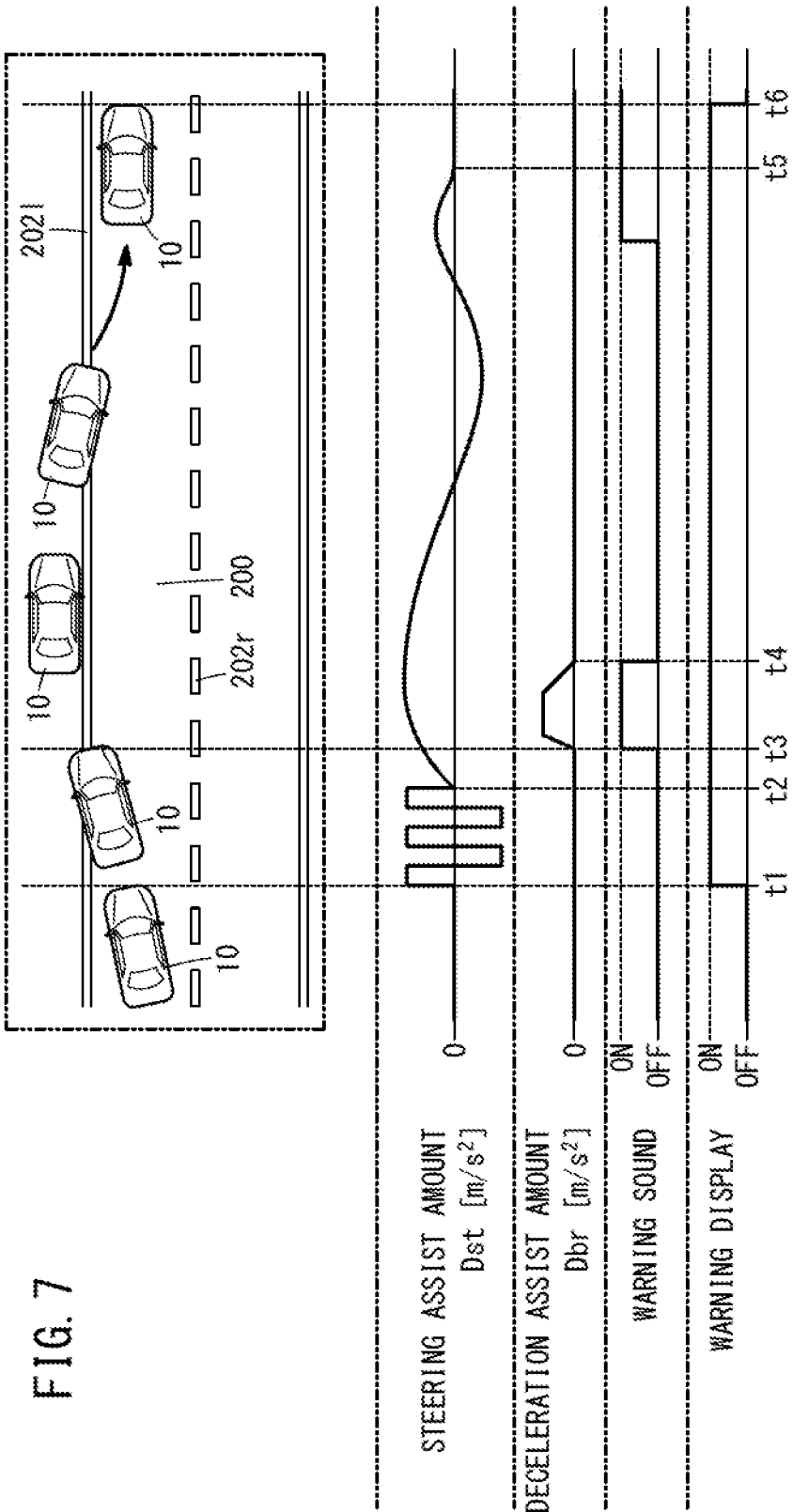
FIG. 7 is a time chart illustrating an example of a case in which the RDM control of the present embodiment is implemented.

The RDM device 16 is a driving assistance device that assists in avoiding a deviation of the vehicle 10 with respect to a travel path 200 (see FIG. 7). As shown in FIG. 1, the RDM device 16 includes a front camera 80 (hereinafter also referred to as a "camera 80"), an RDM switch 82, a monitor 84, a speaker 86, a brake mechanism 88, and a road deviation mitigation electronic control unit 90 (hereinafter referred to as an RDM ECU 90).

The camera 80 (travel path recognizing unit) is mounted on an inner side of a front windshield in front of the rear view mirror. In a state with the RDM switch 82 turned on, the camera 80 captures, as an image, white lines 202l, 202r (road boundary lines) on both sides of the forward travel path 200 (see FIG. 7).

As the monitor 84 and the speaker 86, another vehicle-mounted device (for example, a non-illustrated navigation device) may be used. The brake mechanism 88 includes a non-illustrated hydraulic pressure braking device, which reduces the vehicle velocity V by adding braking forces to the front wheels 42a, 42b and the rear wheels 46a, 46b.

The RDM ECU 90 (deviation acquisition unit, avoidance assistance unit) includes an input/output unit, a computation unit, and a storage unit (none of which are shown). A road deviation mitigation control (hereinafter also referred to as an "ROM control") is implemented for mitigating a deviation of the vehicle 10 from the travel path 200. The road deviation mitigation control of the present embodiment is implemented within the range of the vehicle velocity V, for example, between 60 and 100 [km/h]. The RDM ECU 90 detects the white lines 202l, 202r (FIG. 7) on bath sides of the vehicle 10 from an image (camera image) that is captured by the camera 80. Additionally, when it is determined that a deviation of the vehicle 10 with respect to the travel path 200 actually exists or will exist in the future, the vehicle 10 controls the EPS motor 70 so as to mitigate the deviation. In the example shown in FIG. 7, a case is shown in which the vehicle 10 is driven on the left-hand side of the road.

Further, in the RDM control of the present embodiment, in order for the actual or future deviation of the vehicle 10 with respect to the travel path 200 to be notified to the driver, the RDM ECU 90 operates the EPS motor 70 and causes a slight vibration (warning vibration) to be generated. When the warning vibration is generated, the RDM ECU 90 transmits, to the drive ECU 38, a warning vibration signal Sx by which the generation of the warning vibration is notified.

A5. Drive ECU 38

A-5-1. Overall Configuration (Functional Blocks) of Drive ECU 38

Figure 3:
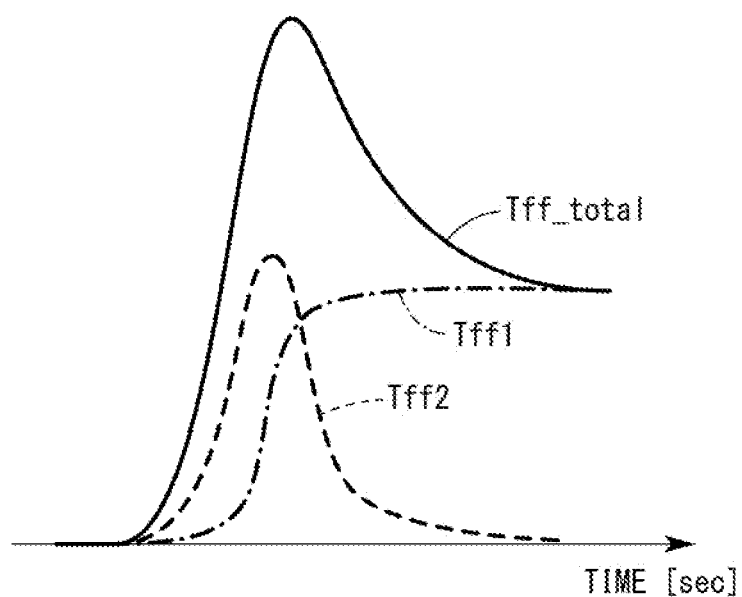
FIG. 3 is a view showing an example of a feed forward control torque concerning an outer wheel from among the left and right rear wheels.

As discussed above, FIG. 2 is a block diagram showing a portion of the drive system 12 of the vehicle 10 according to the present embodiment, in which functional blocks of the drive ECU 38 are shown. FIG. 3 is a view showing an example of a feed forward control torque concerning an outer wheel from among the left and right rear wheels 46a, 46b. The drive ECU 38 implements the functions of the respective blocks shown in FIG. 2 by program processing. However, if necessary, portions of the drive ECU 38 may be replaced by analog circuits or digital circuits.

As shown in FIG. 2, the drive ECU 38 includes a steering angle proportional feed forward control unit 100 (hereinafter referred to as a "steering angle proportional FF control unit 100" or simply an "FF control unit 100"), an EPS motor velocity feed forward control unit 102 (hereinafter referred to as an "EPS motor velocity FF control unit 102" or simply an "FF control unit 102"), a first adder 104, a second adder 106, a low pass filter 108, a feedback control unit 110 (hereinafter referred to as an "FB control unit 110"), a first subtractor 112, and a second subtractor 114.

A-5-2. Steering Angle Proportional FF Control Unit 100

The steering angle proportional FF control unit 100 implements a steering angle proportional feed forward control (hereinafter referred to as a "steering angle proportional FF control"). In the steering angle proportional FF control, torques (driving force) of the driven wheels (in this case, the rear wheels 46a, 46b) are controlled corresponding to the steering angle θst and the lateral acceleration Glat.

More specifically, the FF control unit 100 calculates a steering angle proportional torque Tff1l for the left rear wheel 46a and outputs the same to the first adder 104, and further calculates a steering angle proportional torque Tff1r for the right rear wheel 46b and outputs the same to the second adder 106. Hereinafter, the steering angle proportional torques Tff1l, Tff1r will be referred to collectively as "steering angle proportional torques Tff1" or simply "torques Tff1". In FIG. 3, an example of a torque Tff1 applied with respect to an outer wheel from among the left and right rear wheels 46a, 46b is shown.

In the FF control unit 100, the torques Tff1 are calculated by the same configuration and process as those of the feed forward control unit of U.S. Patent Application Publication No. 2005/0217921 (hereinafter referred to as "US2005/0217921A1") (see element 84 of FIG. 5 of US2005/0217921A1).

More specifically, the FF control unit 100 calculates the wheel driving force F for the rear wheels 46a, 46b, based on the torque (engine torque Teng) of the engine 20 and the torques (first through third motor torques Tmot1, Tmot2, Tmot3) of the first through third motors 22, 24, 26.

Further, the FF control unit 100 calculates an estimated value (estimated lateral acceleration. Glat_e) of the lateral acceleration Glat, based on the vehicle velocity V from the vehicle velocity sensor 50 and the steering angle θst from the steering angle sensor 52. The FF control unit 100 also calculates a corrected value (corrected lateral acceleration Glat_c) of the lateral acceleration Glat, by adding the lateral acceleration Glat (measured value) from the lateral G sensor 54 and the estimated lateral acceleration Glat_e.

In addition, based on the corrected lateral acceleration Glat_c, the FF control unit 100 determines which of the left and right rear wheels 46a, 46b is the outer wheel. Further, based on the corrected lateral acceleration Glat_c, the FF control unit 100 calculates a front and rear distribution ratio and a left and right distribution ratio. Based on the determined outer wheel, and the calculated front and rear distribution ratio and left and right distribution ratio, the FF control unit 100 calculates an outer-wheel/inner-wheel torque distribution ratio in relation to the rear wheels 46a, 46b.

Next, the FF control unit 100 calculates the steering angle proportional torques Tff1l, Tff1r, by multiplying a percentage based on the outer-wheel/inner-wheel torque distribution ratio by the wheel driving force F for the rear wheels 46a, 46b.

A-5-3. EPS Motor Velocity FF Control Unit 102

The EPS motor velocity FF control unit 102 implements an EPS motor velocity feed forward control (hereinafter referred to as an "EPS motor velocity FF control" or a "motor velocity FF control"). The motor velocity FF control controls the torque (driving force) of the driven wheels (in this case, the rear wheels 46a, 46b) corresponding to the EPS motor velocity ω from the EPS ECU 76.

More specifically, the FF control unit 102 calculates an EPS motor velocity torque Tff2l for the left rear wheel 46a and outputs the same to the first adder 104, and further calculates an EPS motor velocity torque Tff2r for the right rear wheel 46b and outputs the same to the second adder 106. Hereinafter, the EPS motor velocity torques Tff2l, Tff2r will be referred to collectively as "EPS motor velocity torques Tff2" or simply "torques Tff2". In FIG. 3, an example of a torque Tff2 applied with respect to an outer wheel from among the left and right rear wheels 46a, 46b is shown.

The FF control unit 102 primarily calculates the torques Tff2 on the basis of the EPS motor velocity ω. The torques Tff2 are torques for the purpose of setting a torque difference ΔT [N·m] of the left and right rear wheels 46a, 46b corresponding to the EPS motor velocity ω. The torque difference ΔT (hereinafter also referred to as a "left and right torque difference ΔT") is a difference between the respective torques (herein, target values) of the left and right rear wheels 46a. 46b. Details of the EPS motor velocity FF control will be discussed later with reference to the flowchart of FIG. 4.

A-5-4. First Adder 104 and Second Adder 106

The first adder 104 calculates a sum of the torque Tff1l from the FF control unit 100 and the torque Tff2l from the FF control unit 102 (hereinafter referred to as a "feed forward total torque T_total_1" or an "FF total torque Tff_total_1").

The second adder 106 calculates a sum of the torque Tff1r from the FF control unit 100 and the torque Tff2r from the FF control unit 102 (hereinafter referred to as a "feed forward total torque Tff_total_r" or an "FF total torque Tff_total_r").

Hereinafter, the FF total torques Tff_total_l, Tff_total_r will be referred to collectively as "FF total torques Tff_total" or simply "torques Tff_total". In FIG. 3, an example of a torque Tff_total applied with respect to an outer wheel from among the left and right rear wheels 46a, 46b is shown.

A-5-5. Low Pass Filter 108

The low pass filter 108 allows passage of only low frequency components of the FF total torque Tff_total_l for the left rear wheel 46a and outputs the same to the first subtractor 112. Further, the low pass filter 108 allows passage of only low frequency components of the FF total torque Tff_total_r for the right rear wheel 46b and outputs the same to the second subtractor 114. Owing thereto, abrupt changes of the FF total torques Tff_total can be avoided. As a result, a sense of unease of the driver with respect to abrupt increase in the FF total torques Tff_total can be avoided.

A-5-6. FB Control Unit 110

The FB control unit 110 implements a feedback control (hereinafter referred to as an "FB control"). In the FB control, torques (driving force) of the driven wheels are controlled such that a slip angle of the vehicle 10 avoids becoming excessively large during turning of the vehicle 10.

More specifically, the FB control unit 110 calculates a feedback torque Tfbl (hereinafter referred to as an "FB torque Tfbl") for the left rear wheel 46a and outputs the same to the first subtractor 112, and further calculates a feedback torque Tfbr (hereinafter referred to as an "FB torque Tfbr") for the right rear wheel 46b and outputs the same to the second subtractor 114. Hereinafter, the FB torques Tfbl, Tfbr will be referred to collectively as "FB torques Tfb" or simply "torques Tfb".

Figure 5:
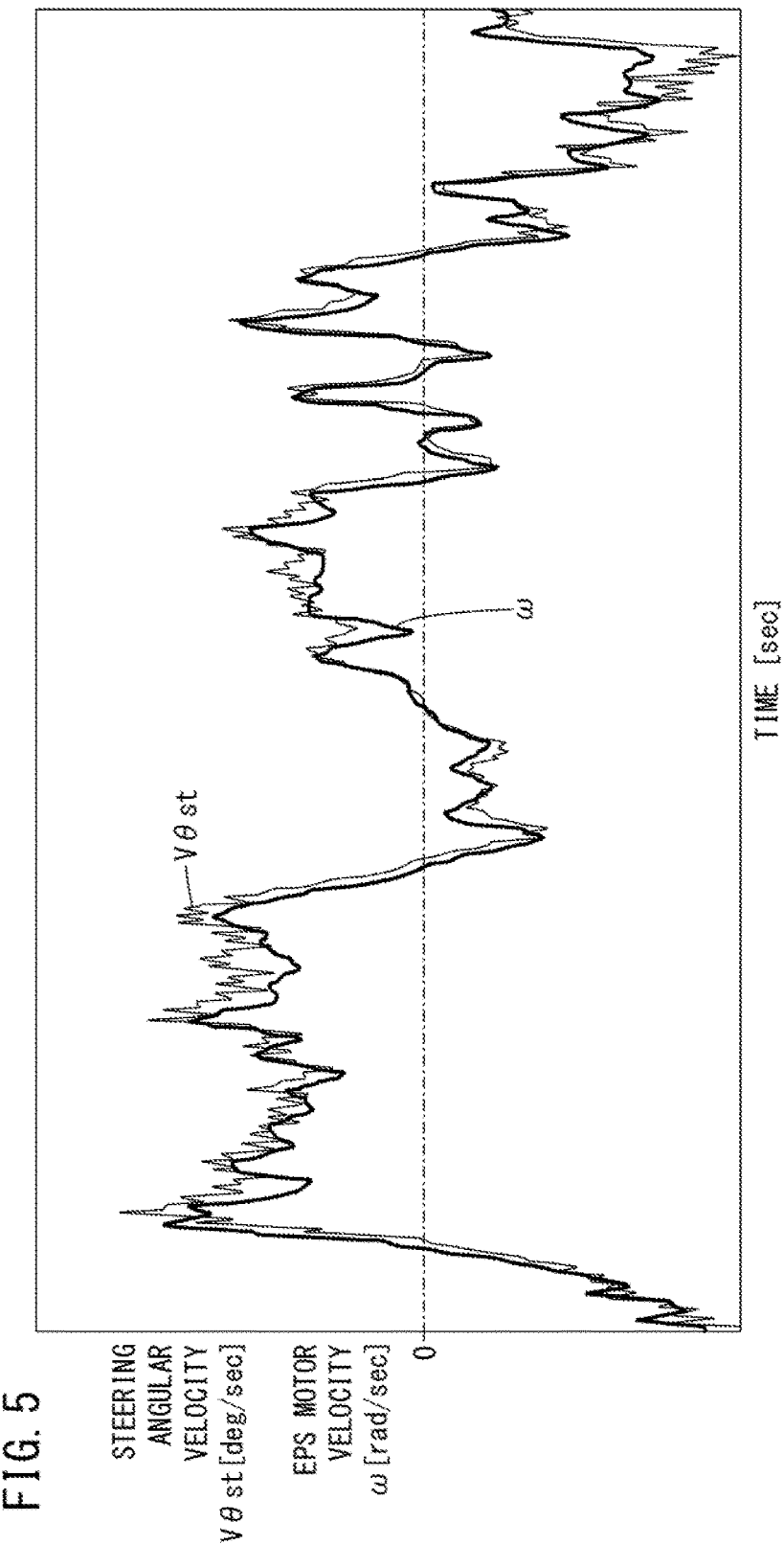
FIG. 5 is a view showing an exemplary output of a steering angular velocity as a time differential value of a steering angle detected by a steering angle sensor, and the EPS motor velocity based on an electrical angle detected by a resolver.

In the FB control unit 110, the torques Tfb are calculated by the same configuration and processes as those of the feedback control unit of US2005/0217921A1 (see element 86 of FIG. 5 of US2005/0217921A1).

More specifically, based on the vehicle velocity V detected by the vehicle velocity sensor 50, the steering angle θst detected by the steering angle sensor 52, the lateral acceleration Glat detected by the lateral G sensor 54, and the yaw rate Yr detected by the yaw rate sensor 58, the FB control unit 110 calculates a slip angle of the vehicle 10. Further, the FB control unit 110 calculates a slip angle threshold value based on the vehicle velocity V detected by the vehicle velocity sensor 50 and the lateral acceleration Glat detected by the lateral G sensor 54.

On the basis of a difference between the slip angle and the slip angle threshold, the FB control unit 110 calculates the FB torques Tfbl, Tfbr such that at least one of an amount of reduction of the rear wheel torques, an amount of reduction of an outer wheel torque, and an amount of increase of an inner wheel torque is calculated. More specifically, the FB control unit 110 determines that the vehicle 10 is in an unstable condition when the slip angle of the vehicle 10 is greater than a predetermined value. In addition, in order to eliminate such an unstable condition, the FB control unit 110 calculates the FB torques Tfbl, Tfbr so as to realize at least one of a reduction of the rear wheel distributed torques, a reduction of the outer wheel distributed torque, and an increase of the inner wheel distributed torque.

A-5-7. First Subtractor 112 and Second Subtractor 114

The first subtractor 112 calculates a difference between the FF total torque Tff_total_l from the low pass filter 108 and the FB torque Tfbl from the FB control unit 110 (hereinafter referred to as a "total torque. Ttotal_l" or simply a "torque Ttotal_l"). The second subtractor 114 calculates a difference between the FF total torque Tff_total_r from the low pass filter 108 and the FB torque Tfbr from the FB control unit 110 (hereinafter referred to as a "total torque Ttotal_r" or simply a "torque Ttotal_r"). Hereinafter, the total torques Ttotal_l, Ttotal_r will be referred to collectively as "total torques Ttotal" or simply "torques Ttotal".

A-6. Outputs of Drive ECU 38 (Torques Tff1, Tff2, Tff_Total)

In FIG. 3, examples of a steering angle proportional torque Tff1, an EPS motor velocity torque Tff2, and an FF total torque Tff_total concerning an outer wheel from among the left and right rear wheels 46a, 46b are shown. As can be understood from FIG. 3, when the steering wheel 60 is operated, the steering angle proportional torque Tff1 and the EPS motor velocity torque Tff2 are increased. At this time, the rise in the steering angle proportional torque Tff1 is comparatively slow. Therefore, by adding thereto the EPS motor velocity torque Tff2, the rise of which is faster than that of the steering angle proportional torque Tff1, it is possible to hasten the rise of the FF total torque Tff_total as a whole.

B. EPS Motor Velocity FF Control

B-1. Process Flow of EPS Motor Velocity FF Control

Figure 4:
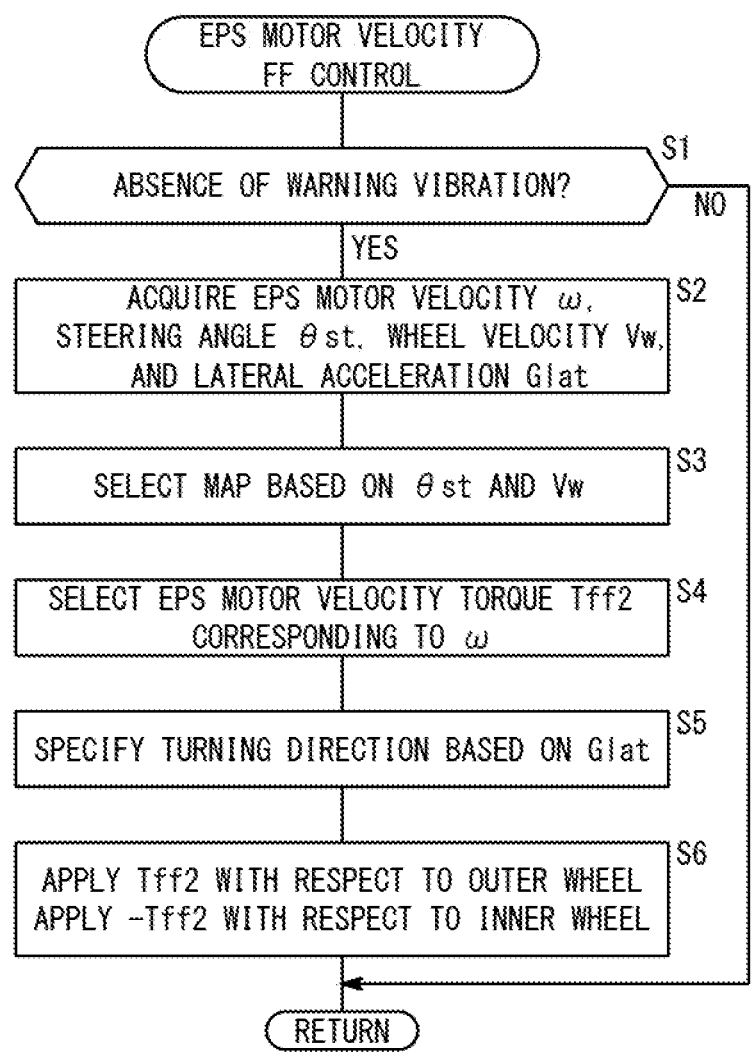
FIG. 4 is a flowchart of an EPS motor velocity feed forward (FF) control in the embodiment.

FIG. 4 is a flowchart of the EPS motor velocity FF control in the present embodiment. In step S1, the EPS motor velocity FF control unit 102 of the drive ECU 38 determines whether or not a warning vibration has not been generated in the RDM device 16. Such a determination is carried out on the basis of the warning vibration signal Sx from the RDM device 16. In the above manner, the warning vibration is in the form of a vibration that is applied to the steering wheel 60 when it is determined that a deviation of the vehicle 10 (driver's own vehicle) with respect to the travel path 200 actually exists or will exist in the future. Further specific details of the warning vibration will be described later with reference to FIG. 7.

If the warning vibration is generated (step S1: NO), the current process of the FF control unit 102 is brought to an end without performing step S2 and the following steps. Accordingly, it becomes possible for malfunctioning of the EPS motor velocity FF control accompanying a warning vibration to be avoided (details thereof will be described later with reference to FIG. 8). If the warning vibration is not generated (step S1: YES), then, the routine proceeds to step S2.

In step S2, the FF control unit 102 acquires the EPS motor velocity ω from the EPS ECU 76, the steering angle θst from the steering angle sensor 52, the wheel velocities Vw from the wheel velocity sensor 56, and the lateral acceleration Glat from the lateral. G sensor 54.

In step S3, the FF control unit 102 selects a map based on a combination of the steering angle θst and the wheel velocities Vw. The map in this case is a map that defines a relationship between the EPS motor velocity ω and the EPS motor velocity torques Tff2. According to the present embodiment, a plurality of the aforementioned maps of combinations between the steering angle θst and the wheel velocity Vw are stored beforehand in a storage unit (not shown) of the drive ECU 38. The wheel velocities Vw are in relation to wheels (rear wheels 46a, 46b in this case) for which the left and right driving force distribution ratio is capable of being changed. For example, an average value of the wheel velocities Vwrl, Vwrr can be used as the wheel velocity Vw. Alternatively, the larger value or the smaller value from among the wheel velocities Vwrl, Vwrr may be used as the wheel velocity Vw. Further, as will be discussed later, methods apart from use of such maps can be used.

With the respective maps, when the EPS motor velocity ω is of a given value, relationships between the EPS motor velocities ω and the EPS motor velocity torques Tff2 are defined, such that the EPS motor velocity torques Tff2 become smaller for a case in which the wheel velocities Vw of the left and right rear wheels 46a, 46b are high, than for a case in which the wheel velocities Vw are low. Further, with the respective maps, when the EPS motor velocity ω is of a given value, relationships between the EPS motor velocities ω and the EPS motor velocity torques Tff2 are defined, such that the EPS motor velocity torques Tff2 become smaller for a case in which the steering angle θst is small, than for a case in which the steering angle θst is large.

In step S4, the FF control unit 102, in the map that was selected in step S3, selects an EPS motor velocity torque Tff2 corresponding to the EPS motor velocity ω acquired in step S2.

In step S5, the FF control unit 102 specifies a turning direction of the vehicle 10 on the basis of the lateral acceleration Glat that was acquired in step S2.

In step S6, the FF control unit 102 applies the EPS motor velocity torque Tff2 with respect to the outer wheel from among the left and right rear wheels 45a, 46b, and applies a negative value −Tff2 of the EPS motor velocity torque Tff2 with respect to the inner wheel. More specifically, concerning the outer wheel, the FF control unit 102 outputs the EPS motor velocity torque Tff2 with respect to the first adder 104 or the second adder 106, and concerning the inner wheel, outputs the negative value Tff2 of the EPS motor velocity torque Tff2 with respect to the first adder 104 or the second adder 106.

B-2. Comparison in Accordance with Presence or Absence of EPS Motor Velocity FF Control FIG. 5 is a view showing an exemplary output of a steering angular velocity Vθst as a time differential value of the steering angle ηst detected by the steering angle sensor 52, and the EPS motor velocity ω based on the electrical angle θe detected by the resolver 72. In the example of FIG. 5, waveforms obtained by applying low pass filtering, respectively, to the steering angular velocity Vθst and the EPS motor velocity ω are shown.

As can be understood from FIG. 5, the responsiveness in the EPS motor velocity ω is higher than that in the steering angular velocity Vθst, and slight and quick variations (or noise) in the EPS motor velocity ω are less frequent than those in the steering angular velocity Vθst. Such a feature, for example, is due to the following reasons.

More specifically, as noted previously, according to the present embodiment, the resolver 72 for the EPS motor 70 is located closer to the side of the front wheels 42a, 42b (steered wheels) than the steering angle sensor 52. Stated otherwise, the steering angle sensor 52 performs detection at a position more distanced from the front wheels 42a, 42b in comparison with the resolver 72. Furthermore, in other words, a distance of the steering angle sensor 52 from the front wheels 42a, 42b in the transmission path (steeling force transmission path) of a steering torque Tst that links the steering wheel 60 with the front wheels 42a, 42b is farther than that of the resolver 72.

Therefore, concerning the relationship thereof with the actual steered angle in the front wheels 42a, 42b, in the steering angle sensor 52, a phase delay occurs, and errors are more likely to be contained than with the resolver 72. Conversely, concerning the relationship thereof with the actual steering angle in the front wheels 42a, 42b, in the resolver 72, it is less likely for such phase delay and errors to be contained than with the steering angle sensor 52. The phase delay referred to herein, for example, is generated due to play or the like in the coupling mechanism (rack and pinion mechanism or the like), or torsion of the shaft. (steering shaft 62, etc.) in the steering force transmission path.

In addition, in general, concerning the mounting of the steering angle sensor 52, which is arranged in the vicinity of the steering wheel 60, precision of the same degree as the mounting of the resolver 72, which is done strictly for the purpose of controlling the EPS motor 70, is not required. Concerning this point as well, in the steering angle sensor 52, there is a possibility for errors the slight and quick variations in FIG. 5) to be more likely contained than in the resolver 72.

In the foregoing manner, the responsiveness in the EPS motor velocity ω is higher than that in the steering angular velocity Vθst, and slight and quick variations (or noise) in the EPS motor velocity ω are less frequent than those in the steering angular velocity Vθst. Therefore, in comparison with a steering angle differential feedforward control (hereinafter referred to as a "steering angle differential FF control") as a comparative example, the EPS motor velocity FF control of the present embodiment is capable of performing calculation of the torque Tff2 with higher responsiveness and higher precision. The steering angle differential FF control referred to herein, in the flowchart of FIG. 4, calculates the torque Tff2 using the steering angular velocity Vθst, which is a time differential value of the steering angle θst, instead of the EPS motor velocity ω.

C. Steering Assist Control

As noted above, the steering assist control is carried out by the EPS device 14 (EPS ECU 76), and controls the steering additive force Fad for the purpose of assisting the steering of the driver. The steering additive force Fad is indicated as a torque, and is the same direction as the steering torque Tst of the driver.

The EPS ECU 76 calculates a target reference current Iref of the EPS motor 70 based on the steering torque Tst and the yaw rate Yr, etc. The target reference current Iref is a reference value of the motor current Im for the purpose of assisting the steering of the driver, and basically, the absolute value of the target reference current Iref increases as the absolute value of the steering torque Tst becomes greater. Further, when the target reference current Iref is calculated, a so-called inertia control, or a damper control, etc., may be used.

In the case that the RDM control is not currently being implemented in the RDM ECU 90, the EPS ECU 76 sets the target reference current Iref, without modification, as the target motor current Imtar (Imtar←Iref). In the case that the RDM control is currently being implemented in the ROM ECU 90, the EPS ECU 76 sets the target motor current Imtar by adding, to the target reference current Iref, a corrective current Icor from the RDM ECU 90 (Imtar←Iref+Icor). In addition, the EPS ECU 76 changes the output of the EPS motor 70 such that the motor current Im matches with the target motor current Imtar.

Further, the corrective current Icor is an additive component for the RDM control. A configuration can also be adopted in which a portion of the calculation for the corrective current Icor is carried out by the EPS ECU 76.

D. RDM Control

Figure 6:
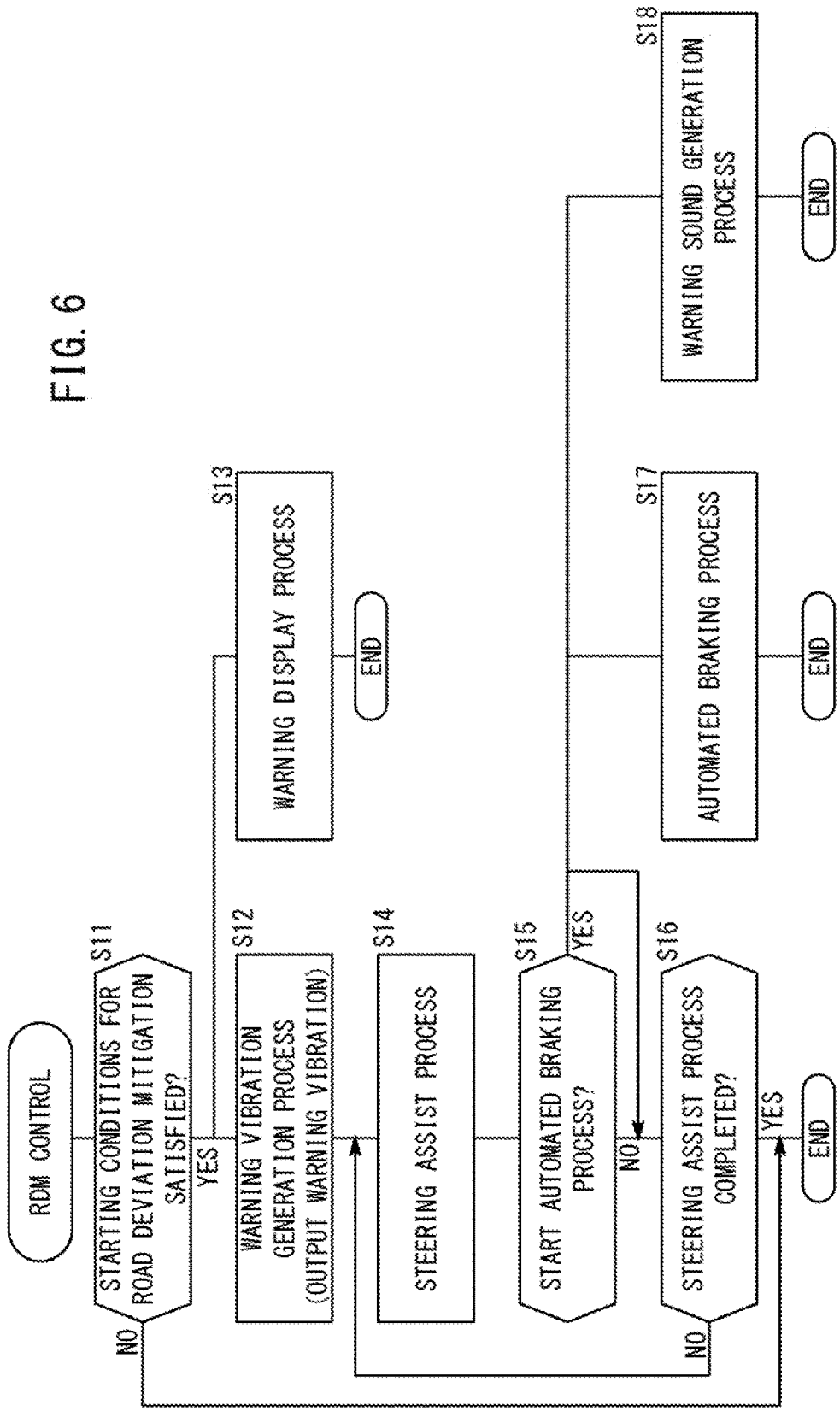
FIG. 6 is a flowchart of a road deviation mitigation (RDM) control in the present embodiment.

FIG. 6 is a flowchart of the ROM control in the present embodiment. The flowchart of FIG. 6 is implemented in the case that the RDM switch 82 is turned on. FIG. 7 is a time chart illustrating an example of a case in which the RDM control of the present embodiment is implemented. As described above, the RDM control serves to mitigate a deviation (a protrusion beyond or outside either one of the white lines 202l, 202r) of the vehicle 10 from the travel path 200. A steering assist amount Dst shown in FIG. 7 is a quantity [m/s²] to assist the steering of the driver as determined by the RDM control. A deceleration assist amount Dbr implies an amount of braking assistance [m/s²] performed by an automatic brake in the RDM control.

In step S11 of FIG. 6, the RDM ECU 90 determines whether or not starting conditions for road deviation mitigation have been satisfied. As such starting conditions, there can be used, for example, that the vehicle velocity V lies within a first predetermined value, that the driver does not have an intention of operating the vehicle, or that the distance up to either one of the white lines 202l, 202r is less than or equal to a first predetermined value while the deviation angle is greater than or equal to a first predetermined value.

If the starting conditions for road deviation mitigation have not been satisfied (step S11: NO), then the current process is brought to an end, and after elapse of a predetermined time, the routine is restarted from step S11. If the starting conditions for road deviation mitigation have been satisfied (step S11: YES), then the routine proceeds to step S12 and step S13.

In step S12, the RDM ECU 90 executes a warning vibration generating process for generating a warning vibration in the steering wheel 60 (time t1 to time t2 of FIG. 7). As noted above, when the warning vibration is generated, the ROM ECU 90 transmits a warning vibration signal Sx to the drive ECU 38. Further, in parallel with step S12, in step S13, the RDM ECU 90 executes a warning display process to display a warning indication on the monitor 84 (time t1 to time t6 of FIG. 7).

Subsequent to step S12, in step S14, the RDM ECU 90 executes a steering assist process (time t2 to time t5 of FIG. 7). In the steering assist process, the steering assist amount Dst (deviation avoidance assistance steering additive force) is generated. During execution of the steering assist process, the RDM ECU 90 determines whether or not to start an automatic braking process. The RDM ECU 90 can carry out such determination, for example, based on the fact that the vehicle velocity V lies within a second predetermined value, the fact that the driver does not have an intention of operating the vehicle, or the fact that the distance up to either one of the white lines 202l, 202r is less than or equal to a second predetermined value while the deviation angle is greater than or equal to a second predetermined value.

In the case that the automatic braking process is not started (step S15: NO), then in step S16, the RDM ECU 90 determines whether or not the steering assist process is completed. For example, it is determined whether or not the vehicle 10 has returned to the travel path 200, and is traveling along the travel path 200 in a state of being separated a predetermined distance from the white line 202l (i.e., between the white lines 202l, 202r). Alternatively, a maximum time threshold (for example a few to several tens of seconds) during which the steering assist process is continued is set in advance, and then it may be determined that the steering assist process is completed, when the time from starting of the steering assist process has reached the maximum time threshold. If the steering assist process is completed (step S16: YES), then the current process is brought to an end, and after elapse of a predetermined time, the routine is restarted from step S11. If the steering assist process is not completed (step S16: NO), the routine returns to step S14, and the steering assist process continues.

Returning to step S15 of FIG. 6, in the case that the automatic braking process is started (step S15: YES), then in step S17, the RDM ECU 90 executes the automatic braking process (time t3 to time t4 of FIG. 7). Further, in parallel with step S17, in step S18, the RDM ECU 90 carries out a warning sound generation process (time t3 to time t4 of FIG. 7).

By the automatic braking process, a braking force is applied to the vehicle 10 by operating the brake mechanism 88. The deceleration assist amount Dbr of FIG. 7 is indicative of application of the braking force by the automatic braking process.

In accordance with the warning sound generation process, a warning sound is output to the driver via the speaker 86. Generation of the warning sound by the warning sound generation process is performed during the time (from time t3 to time t4) that the automatic braking process is being carried out. However, generation of the warning sound need not necessarily coincide entirely with the execution time of the automatic braking process.

Figure 8:
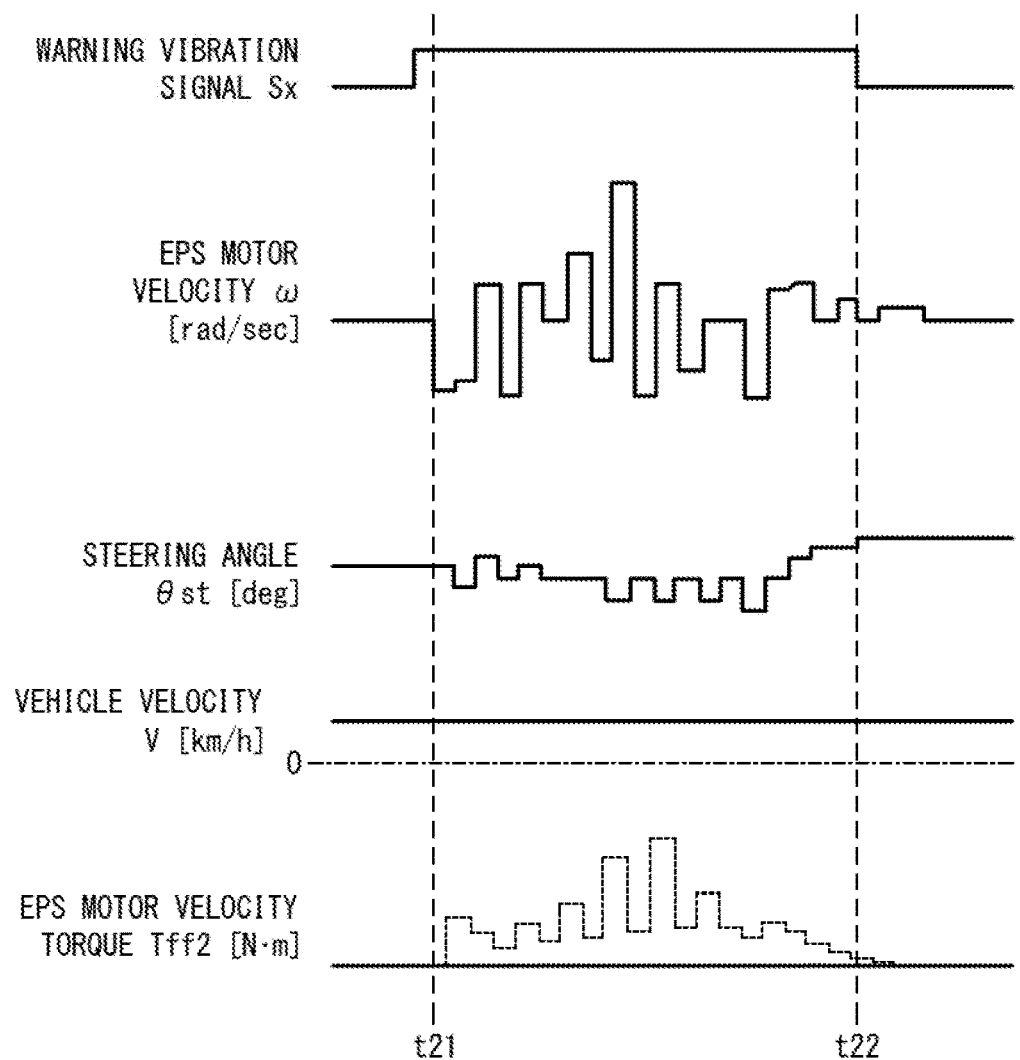
FIG. 8 is a drawing for describing a relationship between a warning vibration and an EPS motor velocity FF control in the present embodiment.

E. Relationship Between Warning Vibration and EPS Motor Velocity FF Control in the RDM Control FIG. 8 is a drawing for describing the relationship between the warning vibration and the EPS motor velocity FF control in the present embodiment. In FIG. 8, when the vehicle 10 is traveling at a constant velocity (the vehicle velocity V is constant), in the case that the warning vibration is carried out by the RDM control (time t1 to time t2 in FIG. 7, time t21 to time t22 in FIG. 8), various types of signals and values are indicated. Further, concerning the EPS motor velocity torque Tff2 in the period from time t21 to time t22, a case in which step S1 of FIG. 4 is carried out is indicated by the solid line, whereas a case in which step S1 is not carried out (only steps S2 to S6 are performed) is indicated by the dashed line.

In the foregoing manner, the warning vibration is generated through use of the EPS motor 70. For this purpose, accompanying generation of the warning vibration, the change of the EPS motor velocity ω becomes intense. If the EPS motor velocity torque Tff2 is generated using the EPS motor velocity ω during the time of a warning vibration, apart from operation of the steering wheel 60 by the driver, the torque Tff2 is generated accompanied by the warning vibration (refer to the torque Tff2 as indicated by the dashed line at time t21 to time t22). However, in this case, there is a concern that a sense of unease or discomfort may be imparted to the driver or a passenger.

In contrast thereto, according to the present embodiment, during the period that the warning vibration is being generated, since the torque Tff2 is made zero (see FIG. 4), imparting of such a sense of unease or discomfort to the driver or passenger can be prevented.

F. Advantages and Effects of the Present Embodiment

As has been described above, according to the present embodiment, in addition to steering of the front wheels 42a, 42b (steered wheels), a yaw moment of the vehicle 10 is controlled using the torques Tff2 in relation to the torque difference ΔT (left and right driving force difference) (see FIGS. 2 and 4). Further, the torque difference ΔT is controlled based on the EPS motor velocity ω of the EPS motor 70 (rotational velocity of rotary electric machine), which imparts a steering additive force Fad to the steering shaft 62 of the vehicle 10 (see FIGS. 2 and 4). Therefore, by making it possible to set the torque difference ΔT in conjunction with the EPS motor velocity ω, the yaw moment of the vehicle 10 can be controlled appropriately.

Furthermore, according to the present embodiment, the torques Tff2 in relation to the torque difference ΔT (left and right driving force difference) are controlled using the EPS motor velocity ω (rotational velocity of rotary electric machine) as a steering condition (see FIGS. 2 and 4).

The resolver 72 (detecting element of rotational velocity acquisition unit) is located closer to the side of the front wheels 42a, 42b (steered wheels) than the steering angle sensor 52 (steering angle acquisition unit). Stated otherwise, the steering angle sensor 52 performs detection at a position more distanced from the front wheels 42a, 42b in comparison with the resolver 72. Furthermore, in other words, a distance of the steering angle sensor 52 from the front wheels 42a, 42b in the transmission path (steering force transmission path) of a steering torque Tst that links the steering wheel 60 with the front wheels 42a, 42b is farther than that of the resolver 72.

In addition, in general, concerning the mounting of the steering angle sensor 52, which is arranged in the vicinity of the steering wheel 60, precision of the same degree as the mounting of the resolver 72, which is done strictly for the purpose of controlling the EPS motor 70, is unasked. Concerning this point as well, in the steering angle sensor 52, there is a possibility for errors (the slight and quick variations in FIG. 5) to be more likely contained than in the resolver 72.

In accordance with the above, concerning the relationship thereof with the actual steered angle in the front wheels 42a, 42b, in the steering angle sensor 52, a phase delay occurs, and errors are more likely to be contained than with the resolver 72. Conversely, concerning the relationship thereof with the actual steering angle in the front wheels 42a, 42b, in the resolver 72, it is less likely for such phase delay and errors to be contained than with the steering angle sensor 52. Consequently, compared to the case in which the steering angular velocity Vθst is used, the torque difference ΔT can be controlled with higher responsiveness (see FIG. 5). Accordingly, it is possible to improve the attitude control or the operational performance of the vehicle 10.

Further still, at a time that there is a deviation or a likelihood of a deviation of the vehicle 10 with respect to the travel path 200, or when the RDM ECU 90 (avoidance assistance unit) produces the warning vibration (notifying operation) or imparts the steering assist amount Dst (deviation avoidance assistance steering additive force), control of the left and right torque difference ΔT (left and right driving force difference) based on the EPS motor velocity ω (rotational velocity) is prohibited or suppressed (see FIGS. 4 and 8). Consequently, it is possible to prevent interference of the warning vibration with respect to the control of the torque difference ΔT (EPS motor velocity FF control) on the basis of the EPS motor velocity ω, and it is possible for the control of the torque difference ΔT based on the EPS motor velocity ω to coexist together with the warning vibration. Stated otherwise, the EPS motor velocity FF control is capable of being implemented, even in a vehicle 10 in which the RDM device 16 is included.

In the present embodiment, the steering system includes the steering angle sensor 52 (steering amount acquisition unit) for acquiring the steering angle θst (steering amount of the driver (steering subject)) of the vehicle 10 (see FIG. 2). Further, on the transmission path (steering force transmission path) of the steering torque Tst, the EPS motor 70 is arranged more closely to the front wheels 42a, 42b (steered wheels) than the steering angle sensor 52. With the steering assist control performed by the EPS ECU 76, the steering additive force Fad is determined based on the steering angle θst (steering amount).

In accordance with the above, the torque Tff2 in relation to the torque difference ΔT (left and right driving force difference) is controlled based on the EPS motor velocity ω (rotational velocity), which is calculated from the electrical angle θe detected by the resolver 72, which is located more closely to the front wheels 42a, 42b than the steering angle sensor 52. Consequently, compared to the case of controlling the torques Tff2 based on the steering angular velocity Vθst, which is calculated from the steering angle θst detected by the steering angle sensor 52, it is possible to control the torque difference ΔT with higher responsiveness and higher accuracy.

In the present embodiment, the rear wheel driving device 48 (driving device) includes the left motor 24 (left rotary electric machine) connected mechanically to the left rear wheel 46a, and the right motor 26 (right rotary electric machine) connected mechanically to the right rear wheel 46b (FIG. 1). In accordance therewith, for example, in comparison with a second modification (FIG. 10) and a third modification (FIG. 11) to be discussed later, the left and right torque difference ΔT (left and right driving force difference), and a yaw moment of the vehicle 10 involved with the torque difference can be controlled rapidly and precisely.

In the present embodiment, the drive ECU 38 (drive control device) executes the steering angle proportional FF control (steering amount proportional control) that controls the left and right torque difference ΔT (left and right driving force difference) based on the steering angle θst (steering amount) and the lateral acceleration Glat (see FIG. 2). Further, the drive ECU 38 controls the torque difference ΔT by combining the EPS motor velocity FF control (control of the left and right driving force difference based on the rotational velocity) and the steering angle proportional FF control (see FIG. 2). Furthermore, when the RDM ECU 90 (deviation acquisition unit) has acquired the deviation or the likelihood of the deviation of the vehicle 10 with respect to the travel path 200, the drive ECU 38 prohibits the EPS motor velocity FF control, together with continuing the steering angle proportional FF control (see FIGS. 2 and 4).

Consequently, even at a time that a deviation or the likelihood of a deviation of the vehicle 10 with respect to the travel path 200 exists control of the left and right torque difference ΔT can be continued within a range that is not affected by the warning vibration (notifying operation).

In the present embodiment, when a deviation or the likelihood of a deviation of the vehicle 10 with respect to the travel path 200 exists, the RDM ECU 90 (avoidance assistance unit) produces the warning vibration (notifying operation) with respect to the steering wheel 60 (steering input device) of the steering system by driving the EPS motor 70 (rotary electric machine) (step S12 of FIG. 6, time t1 to time t2 of FIG. 7). And thereafter, the RDM ECU 90 imparts the steering assist amount Dst (deviation avoidance assistance steering additive force) with respect to the steering system (step S14 of FIG. 6, time t2 to time t5 of FIG. 7). Furthermore, the drive ECU 38 (drive control device) prohibits control of the torque difference ΔT difference based on the EPS motor velocity ω (rotational velocity), when the warning vibration signal Sx is received from the ROM ECU 90 (or stated otherwise, when the ROM ECU 90 (deviation acquisition unit) has acquired the deviation or the likelihood of the deviation, or when the ROM ECU 90 (avoidance assistance unit) produces the warning vibration, step S1 of FIG. 4: NO).

Consequently, it is possible to reliably prohibit the control of the torque difference ΔT (left and right driving force difference) based on the EPS motor velocity ω, prior to imparting the steering assist amount Dst with respect to the steering system.

II. Modifications

The present invention is not limited to the above-described embodiment, and based on the disclosed content of the present specification, it is a matter of course that various configurations may be adopted. For example, the following configurations can be adopted.

A. Vehicle 10 (Object to Which the Invention is Applied)

According to the above-described embodiment, the vehicle 10 in the form of a four-wheeled motor vehicle has been described (see FIG. 1). However, the present invention is not limited to such a four-wheeled motor vehicle, insofar as the torque difference ΔT (left and right driving force difference) between the left rear wheel 46a (left driven wheel) and the right rear wheel 46b (right driven wheel) can be adjusted on the basis of the EPS motor velocity ω. For example, the present invention may be applied to a three-wheeled motor vehicle or a six-wheeled motor vehicle.

According to the above embodiment, the vehicle 10 uses the single engine 20 and the three traction motors 22, 24, 26 as drive sources (prime movers) (see FIG. 1). However, the drive sources are not limited to such a combination. For example, the vehicle 10 may have one or a plurality of traction motors for the front wheels 42 and one or a plurality of traction motors for the rear wheels 46, which serve as drive sources. For example, the vehicle 10 may have a single traction motor for the front wheels 42 or the rear wheels 46. In this case, the driving forces are distributed to the left and right wheels by a differential device. The vehicle 10 may also have a configuration in which individual traction motors (including so-called in-wheel motors) are assigned respectively to all of the wheels.

According to the above-described embodiment, the front wheel driving device 44 including the engine 20 and the first motor 22 drives the front wheels 42, whereas the rear wheel driving device 48 including the second and third motors 24, 26 drives the rear wheels 46. However, the present invention is not limited to such an arrangement, insofar as the torque difference ΔT (motive power difference) between the left wheel and the right wheel can be adjusted, for example, on the basis of the EPS motor velocity ω. For example, according to the above embodiment, the torque difference ΔT (motive power difference) that is adjusted occurs between the left and right rear wheels 46a, 46b. However, depending on the structure of the vehicle 10, it also is possible to adjust the torque difference ΔT between the front wheels 42a, 42b.

A-1. First Modification

Figure 9:
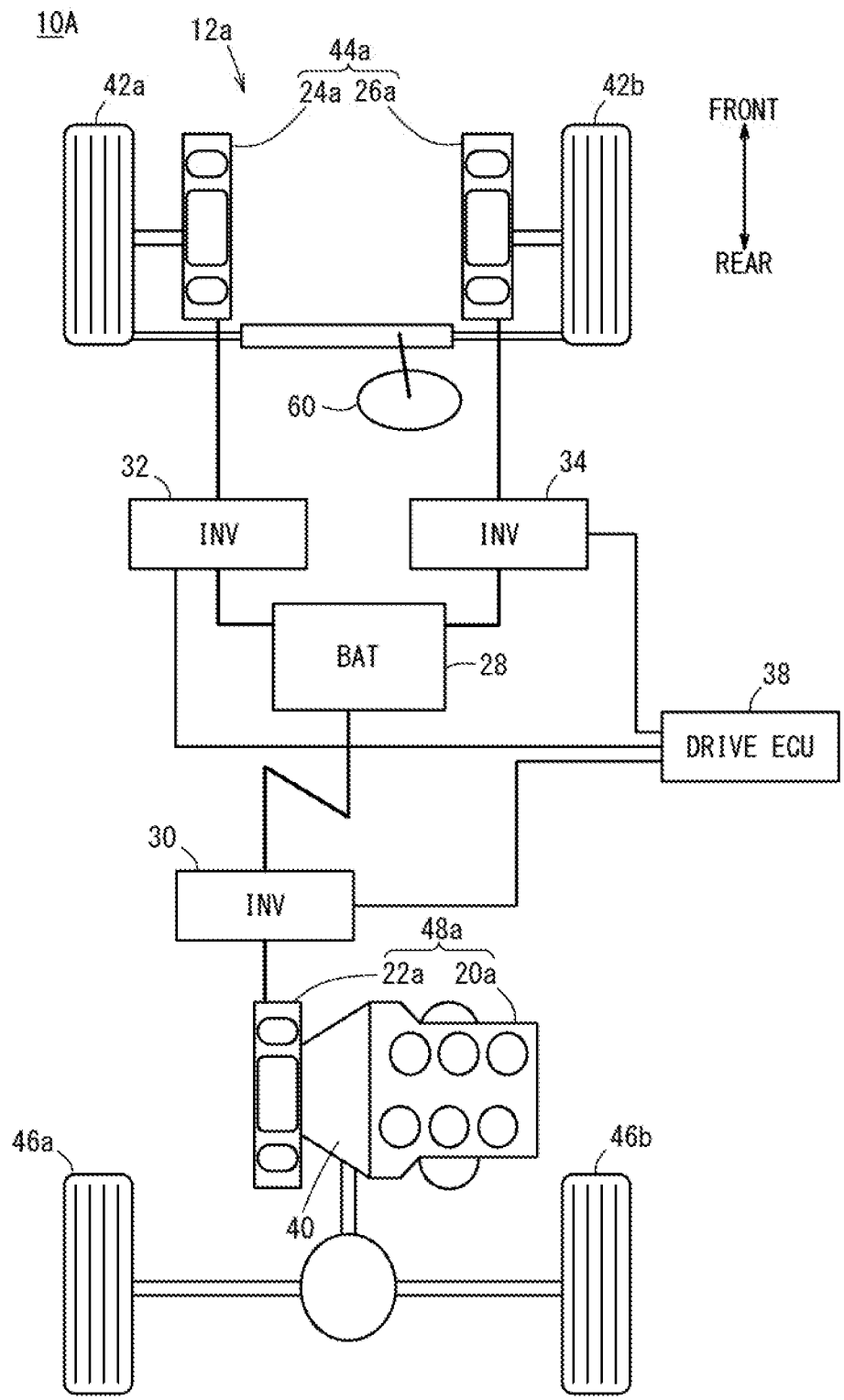
FIG. 9 is an outline schematic view of a portion of a vehicle according to a first modification of the present invention.

FIG. 9 is an outline schematic view of a portion of a vehicle 10A according to a first modification of the present invention. With the drive system 12a of the vehicle 10A, a front wheel driving device 44a and a rear wheel driving device 48*a* are provided, which are a structural reversal of the front wheel driving device 44 and the rear wheel driving device 48 of the vehicle 10 according to the aforementioned embodiment. More specifically, the front wheel driving device 44*a* of the vehicle 10A includes second and third traction motors 24*a*, 26*a*, which are disposed in a front region of the vehicle 10A. Further, the rear wheel driving device 48*a* of the vehicle 10A includes an engine 20*a* and a first traction motor 22*a*, which are disposed in series in a rear region of the vehicle 10A. In FIG. 9, the EPS device 14 and the RDM device 16 are omitted from illustration (the same applies to FIGS. 10 and 11, to be discussed later).

A-2. Second Modification

Figure 10:
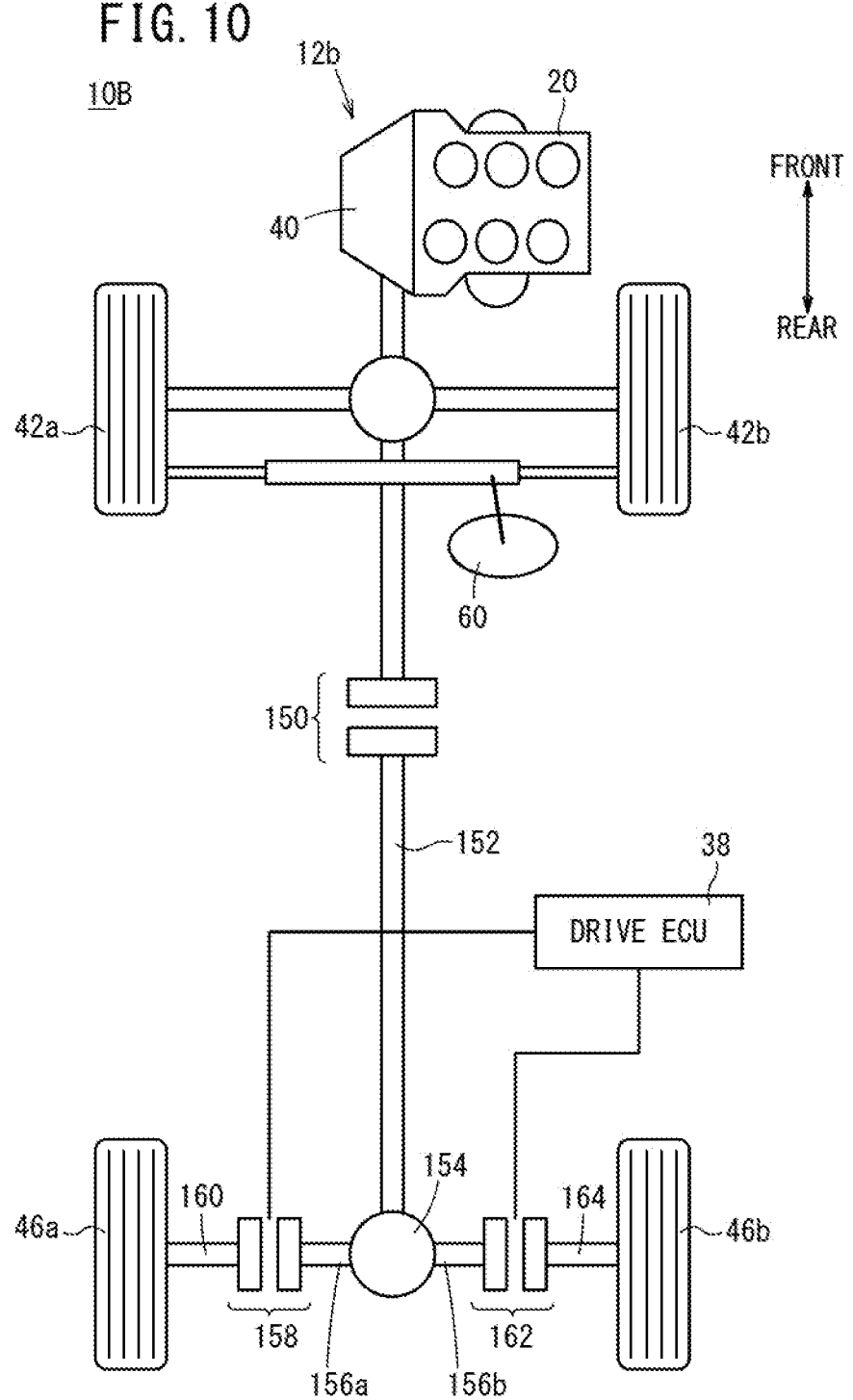
FIG. 10 is an outline schematic view of a portion of a vehicle according to a second modification of the present invention.

FIG. 10 is an outline schematic view of a portion of a vehicle 10B according to a second modification of the present invention. In the drive system 12*b* of the vehicle 10B, a driving force from the engine 20 (hereinafter referred to as a "driving force Feng") is transmitted to the front wheels 42*a*, 42*b* and the rear wheels 46*a*, 46*b*. In this manner, in addition to the front wheels 42*a*, 42*b* (main driven wheels), the rear wheels 46*a*, 46*b* (auxiliary driven wheels) are used as driven wheels. As with the previous embodiment (FIG. 1), the motor 22 may be connected to the engine 20.

The vehicle 10B includes a transfer clutch 150, a propeller shaft 152, a differential gear 154, differential gear output shafts 156*a*, 156*b* (hereinafter also referred to as "output shafts 156*a*, 156*b*"), a first clutch 158, a left output shaft 160, a second clutch 162, and a right output shaft 164.

The transfer clutch 150 adjusts the driving force Feng from the engine 20, which is distributed to the rear wheels 46*a*, 46*b* through the propeller shaft 152 on the basis of a command from the drive ECU 38. The differential gear 154 distributes the driving force Feng, which is transmitted to the rear wheels 46*a*, 46*b* through the propeller shaft 152, as equal driving forces to the left and right output shafts 156*a*, 156*b*.

The first clutch 158 adjusts the degree of engagement thereof based on a command from the drive ECU 38, and transmits the driving force from the output shaft 156*a* to the left output shaft 160, which is fixedly coupled to the left rear wheel 46*a*. The second clutch 162 adjusts the degree of engagement thereof based on a command from the drive ECU 38, and transmits the driving force from the output shaft 156*b* to the right output shaft 164, which is fixedly coupled to the right rear wheel 46*b*.

With the above arrangement, the vehicle 10B is capable of individually adjusting the driving forces (torques) of the rear wheels 46*a*, 46*b*.

With the vehicle 10B according to the second modification, the engine 20 (prime mover) and the left rear wheel 46*a* (left driven wheel) are connected to each other through the first clutch 158 (first motive power transmitting mechanism). Further, the engine 20 and the right rear wheel 46*b* (right driven wheel) are connected to each other through the second clutch 162 (second motive power transmitting mechanism). The first clutch 158 and the second clutch 162 are not only capable of simply switching between an engaged state and a disengaged state, but also can adjust the degree of slippage of the first clutch 158 and the second clutch 162 for thereby switching between a plurality of stages of the engaged state or the disengaged state.

Further, on the basis of the EPS motor velocity ω of the EPS motor 70, the drive ECU 38 (control unit) controls the first clutch 158 and the second clutch 162, and adjusts the torque difference ΔT between the left rear wheel 46*a* and the right rear wheel 46*b*.

Furthermore, the first clutch 158 is capable of being switched between an engaged state for transmitting motive power between the engine 20 and the left rear wheel 46*a*, and a disengaged state for cutting off transmission of motive power between the engine 20 and the left rear wheel 46*a*. Similarly, the second clutch 162 is capable of being switched between an engaged state for transmitting motive power between the engine 20 and the right rear wheel 46*b*, and a disengaged state for cutting off transmission of motive power between the engine 20 and the right rear wheel 46*b*. Further still, on the basis of the EPS motor velocity ω, the drive ECU 38 switches the engaged state and the disengaged state of the first clutch 158 and the second clutch 162, whereby the torque difference ΔT between the left rear wheel 46*a* and the right rear wheel 46*b* is adjusted.

With the above arrangement, the drive ECU 38 adjusts the torque difference ΔT between the left and right rear wheels 46*a*, 46*b* by engaging and disengaging the first clutch 158 and the second clutch 162. In this manner, it is possible to adjust the torque difference ΔT between the left and right rear wheels 46*a*, 46*b* by engaging and disengaging the first clutch 158 and the second clutch 162. Therefore, it is possible to generate the torque difference ΔT with high responsiveness.

A-3. Third Modification

Figure 11:
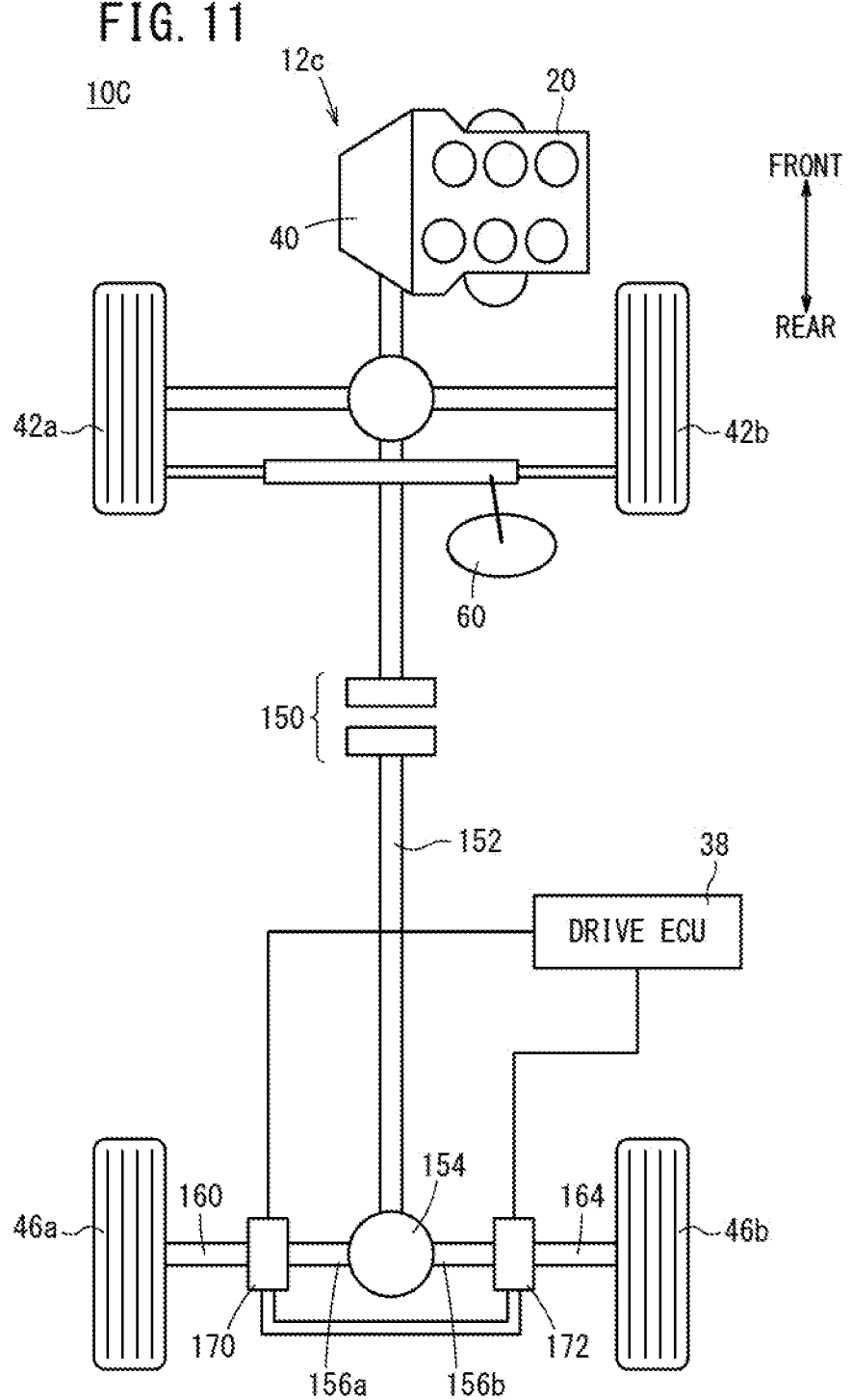
FIG. 11 is an outline schematic view of a portion of a vehicle according to a third modification of the present invention.

FIG. 11 is an outline schematic view of a portion of a vehicle 10C according to a third modification of the present invention. Similar to the drive system 12*b* of the vehicle 10B according to the second modification, the drive system 12*c* of the vehicle 10C is arranged such that a driving force from the engine 20 (driving force Feng) is transmitted to the front wheels 42*a*, 42*b* and the rear wheels 46*a*, 46*b*. In this manner, the rear wheels 46*a*, 46*b* (auxiliary driven wheels) are used as driven wheels in addition to the front wheels 42*a*, 42*b* (main driven wheels). Constituent elements of the vehicle 10C that are the same as those of the vehicle 10B are denoted by the same reference characters, and detailed description of such features is omitted. Incidentally, as with the previous embodiment (FIG. 1), the motor 22 may be connected to the engine 20.

In addition to a transfer clutch 150, a propeller shaft 152, a differential gear 154, differential gear output shafts 156*a*, 156*b* (output shafts 156*a*, 156*b*), a left output shaft 160, and a right output shaft 164, the vehicle 10C also includes a first redistribution mechanism 170 and a second redistribution mechanism 172.

When the vehicle 10C makes a left turn, the first redistribution mechanism 170 transmits part or all of the driving force, which is distributed or branched from the differential gear 154 for use by the left rear wheel 46*a*, to the right rear wheel 46*b*. The first redistribution mechanism 170 includes a left-turn clutch, a sun gear for the left rear wheel 46*a*, a set of three meshing pinion gears, and a sun gear for the right rear wheel 46*b* (none of which are shown).

When the vehicle 10C makes a right turn, the second redistribution mechanism 172 transmits part or all of the driving force, which is distributed or branched from the differential gear 154 for use by the right rear wheel 46*b*, to the left rear wheel 46*a*. The second redistribution mechanism 172 includes a right-turn clutch, a sun gear for the right rear wheel 46b, a set of three meshing pinion gears, and a sun gear for the left rear wheel 46a (none of which are shown).

The left-turn clutch of the first redistribution mechanism 170 and the right-turn clutch of the second redistribution mechanism 172 are not only capable of simply switching between an engaged state and a disengaged state, but also can adjust a degree of slippage for thereby switching between a plurality of stages of the engaged state or the disengaged state.

With the above arrangement, the vehicle 10C is capable of individually adjusting the driving forces of the rear wheels 46a, 46b.

B. First Through Third Motors 22, 24, 26

According to the above embodiment, each of the first through third traction motors 22, 24, 26 comprises a three-phase AC brushless motor. However, the first through third traction motors 22, 24, 26 are not limited to such motors, but may comprise any of a three-phase AC brush motor, a single-phase AC motor, or a DC motor.

According to the above embodiment, the first through third traction motors 22, 24, 26 are supplied with electric power from the high-voltage battery 28. However, the first through third traction motors 22, 24, 26 may be supplied additionally with electric power from a fuel cell.

C. EPS Device 14

C-1. Overall Structure of EPS Device 14

The EPS device 14, according to the above embodiment comprises a structure in which the EPS motor 70 transmits the steering additive force Fad to the steering shaft 62 (a so-called column-assisted EPS device) (see FIG. 1). However, the EPS device 14 is not limited to such a structure, insofar as the EPS device 14 is capable of generating the steering additive force Fad. For example, the EPS device 14 may be any one of a pinion-assisted EPS device, a dual-pinion-assisted EPS device, a rack-assisted EPS device, and an electro-hydraulic power steering device. In the electro-hydraulic power steering device, an electrically operated pump generates a hydraulic pressure for producing the steering additive force Fad.

In the above embodiment, the steering torque Tst applied by the driver is directly transmitted to the front wheels 42a, 42b (hereinafter referred to as a "direct transmission type"). However, the present invention also may be applied to a steer-by-wire type of EPS device. In the case of a steer-by-wire type of EPS device, the EPS device itself generates the steering force, without a steering torque Tst of the driver being transmitted to the steered wheels (front wheels 42a, 42b). Stated otherwise, with the steer-by-wire type of EPS device, instead of the steering additive force Fad, the steering force (steering torque Tst) itself is applied to the steering system of the vehicle 10.

C-2. EPS Motor 70

In the above embodiment, the EPS motor 70 comprises a three-phase AC brushless motor, however, the invention is not limited to this feature. For example, the motor 70 may be constituted by a three-phase AC brush motor, a single-phase AC motor, or a DC motor.

D. Torque Control

D-1. Overall Configuration

According to the above embodiment, all of the steering proportional FF control, the EPS motor velocity FF control, and the FB control are carried out, respectively (FIG. 2). However, for example, insofar as attention is paid to the EPS motor velocity FF control, one or both of the steering proportional FF control and the FB control can be omitted.

With the above embodiment, it is assumed that the torques of the front wheel driving device 44 and the rear wheel driving device 48 are controlled based on operation of the accelerator pedal by a driver (steering subject) who is situated in the vehicle 10. However, for example, from the standpoint of controlling the torques of the front wheel driving device 44 and the rear wheel driving device 48, the invention is not limited to this feature. For example, the present invention is also applicable to a configuration (a so-called automated driving configuration) in which the torques of the front wheel driving device 44 and the rear wheel driving device 48 are controlled automatically in the vehicle 10. Further, the automated driving referred to herein is not limited to the torques of the front wheel driving device 44 and the rear wheel driving device 48, and may also perform steering automatically. Further, the present invention is also applicable to a configuration in which a driver operates the vehicle 10 remotely from outside of the vehicle 10.

In the above embodiment, the drive ECU 38 performs controls in which the torques per se of the front wheel driving device 44 and the rear wheel driving device 48 are treated as targets of calculation (see FIG. 2). However, for example, from the standpoint of controlling the torques (drive power amounts) of the front wheel driving device 44 and the rear wheel driving device 48, the invention is not limited to this feature. For example, the drive ECU 38 can carry out controls in which, instead of torques, outputs or driving forces that are capable of being converted into torques are treated as targets of calculation.

D-2. EPS Motor Velocity FF Control

With the above embodiment, maps based on the steering angle θct and the wheel velocities VW, and the EPS motor velocity ω are used in calculating (selecting) the EPS motor, velocity torque Tff2 (steps S3, S4 of FIG. 4). However, for example, insofar as attention is paid to usage of the torque Tff2, the invention is not limited to this feature. For example, a single map may be provided in which a relationship between the EPS motor velocity ω and the torque Tff2 is prescribed, and the torque Tff2 may be selected or calculated using such a single map. Stated otherwise, in FIG. 4, step S3 can be omitted, and step S4 can be left remaining.

According to the above embodiment, the torque Tff2 is added with respect to the outer wheel from among the left and right rear wheels 46a, 46b, and the torque Tff2 is subtracted from the inner wheel (that is, −Tff2 is added to the inner wheel). However, from the standpoint of adjusting the torque difference ΔT (driving force difference) between the left rear wheel 46a (left driven wheel) and the right rear wheel 46b (right driven wheel) on the basis of the EPS motor velocity ω in addition to the steering angle θct, the invention is not limited to this feature. For example, a configuration in which only the torque Tff2 is added with respect to the outer wheel, or a configuration in which only the torque Tff2 is subtracted from the inner wheel is possible.

According to the above embodiment, in the case that the EPS motor velocity ω is faster, the torque difference ΔT is increased (step S4 of FIG. 4). However, conversely, in the case that the EPS motor velocity ω is faster, the torque difference ΔT can be reduced. In accordance therewith, for example, it becomes easy to prevent slippage of the vehicle 10 in the case of sudden steering on a snow-covered road or the like.

According to the above embodiment, if the starting conditions for road deviation mitigation are satisfied (step S11 of FIG. 6: YES), or stated otherwise, if there is a deviation or the likelihood of a deviation of the vehicle 10 with respect to the travel path 200, the warning vibration is generated as a repetitive vibration (step S12 of FIG. 6, FIG.). However, for example, from the standpoint of providing a notification of a deviation or the likelihood of a deviation of the vehicle 10 with respect to the travel path 200, the notifying operation may be effected other than by way of a warning vibration. For example, it is possible to perform a notifying operation in which amplitude change is caused one time only.

According to the above embodiment, if the starting conditions for road deviation mitigation are satisfied (step S11 of FIG. 6: YES), or stated otherwise, in the case there is a deviation or the likelihood of a deviation of the vehicle 10 with respect to the travel path 200 and the warning vibration is generated, then usage of the torque Tff2 is prohibited (see FIG. 4 and FIG. 8). However, for example, from the standpoint of prohibiting or limiting usage of the torque Tff2, the invention is not limited to this feature. For example, in the case that output of the warning vibration (step S12 of FIG. 6) is not carried out in the RDM control, it is also possible for usage of the torque Tff2 to be prohibited or limited during the time of the steering assist process (or during generation of the steering assist amount Dst).

According to the above embodiment, the EPS motor 70 is used as a constituent element that causes generation of the warning vibration (step S12 of FIG. 6). However, for example, from the standpoint of causing the occurrence of the warning vibration in the steering wheel 60, the invention is not limited to this feature. For example, a vibration generating device can be provided in the steering wheel 60, and the warning vibration can be produced by such a vibration generating device.

According to the above embodiment, during the period in which the warning vibration is generated, the warning vibration signal Sx is output (time t21 to time t22 of FIG. 8). However, for example, from the standpoint of determining the period in which the warning vibration is generated, the invention is not limited to this feature. For example, with a configuration in which the warning vibration is generated for a predetermined time period after the producing of the warning vibration signal Sx, the drive ECU 38 may determine that the warning vibration is generated for the predetermined time period after the reception of the warning vibration signal Sx.

According to the above embodiment, during the period in which the warning vibration is generated, the torque Tff2 is set to zero (see FIGS. 4 and 8). However, for example, from the standpoint of suppressing a change in the total torque Ttotal accompanying the warning vibration, the torque Tff2 need not necessarily go to zero immediately. For example, during the period in which the warning vibration is generated, the torque Tff2 may be reduced at a predetermined rate of reduction. Stated otherwise, when the warning vibration is generated, the EPS motor velocity FF control can be suppressed.

D-3. EPS Motor Velocity ω

According to the above embodiment, the EPS motor velocity ω [rad/sec] is calculated directly from the electrical angle θe that is detected by the resolver 72. However, for example, from the standpoint of using the rotational velocity of the EPS motor 70, the invention is not limited to this feature. For example, a mechanical angle of the EPS motor 70 may be determined from the electrical angle θe, and the EPS motor velocity ω may be calculated from the mechanical angle.

D-4. Other Features

With the above embodiment, the EPS motor velocity FF control for causing a change in the torque Tff2 corresponding to the EPS motor velocity ω is used as it is (see FIG. 4). However, for example, from the standpoint of setting torques Tff2 (torques that define the left and right torque difference ΔT) on the basis of the EPS motor velocity ω, the invention is not limited to this feature. For example, torques Tff2 that are calculated based on the EPS motor velocity ω can be corrected responsive to a time differential value of the EPS motor velocity ω (motor acceleration).

According to the above embodiment, in the EPS motor velocity FF control, the torque difference ΔT of the left and right rear wheels 46a, 46b is changed corresponding to the EPS motor velocity ω (step S4 of FIG. 4). However, for example, from the standpoint of changing the torques of the left and right rear wheels 46a, 46b responsive to the EPS motor velocity ω, the invention is not limited to this feature. For example, in addition to or instead of adjusting the torque difference ΔT, the FF total torque Tff_total (for example, the torque Tff2) can be increased or decreased in value corresponding to the EPS motor velocity ω. For example, if the EPS motor velocity ω is increased, the FF total torque Tff_total can also be made to increase.

Although the rear wheel driving device 48 (driving device) of the above embodiment is capable of controlling the left and right torque difference ΔT as a left and right driving force difference, which is a difference between the left driving force and the right driving force, the invention is not limited to this feature. For example, it is possible for the rear wheel driving device 48, in addition to the left and right driving farce difference, to be capable of controlling a left and right driving force sum, which is the sum of the left driving force and the right driving force.

III. Description of Reference Numerals 10, 10A, 10B, 10C: vehicle,
16: RDM device (driving assistance device)
24, 24a: left motor (left rotary electric machine),
26, 26a: right motor (right rotary electric machine),
38: drive ECU (drive control device),
42a: left front wheel (steered wheel),
42b: right front wheel (steered wheel),
44a: front wheel driving device (driving device),
46a: left rear wheel,
46b: right rear wheel,
48: rear wheel driving device (driving device),
52: steering angle sensor (steering amount acquisition unit),
60: steering wheel (steering input device),
70: EPS motor (rotary electric machine),
72: resolver (part of rotational velocity acquisition unit),
76: EPS ECU (part of rotational velocity acquisition unit), 80: front camera (travel path recognizing unit),
90: RDM ECU (deviation acquisition unit, avoidance assistance unit),
200: travel path,
Glat: lateral acceleration,
Fad: steering additive force,
Sx: warning vibration signal,
Tst: steering torque (steering force),
ΔT: left and right torque difference (left and right driving force difference),
θst: steering angle (steering amount),
ω: EPS motor velocity (rotational velocity)

The invention claimed is:

1. A vehicle comprising:
a driving device configured to control a left and right driving force difference, which is a difference between a left driving force and a right driving force, by controlling the left driving force and the right driving force, the left driving force being a driving force of a left wheel of the vehicle, the right driving force being a driving force of a right wheel of the vehicle;
a drive control device configured to control the driving device;
a rotary electric machine connected mechanically to steered wheels and configured to impart a steering force or a steering additive force to a steering system including the steered wheels; and
a driving assistance device configured to assist avoidance of a deviation of the vehicle with respect to a travel path;
wherein the driving assistance device includes:
a travel path recognizing unit configured to recognize the travel path;
a deviation acquisition unit configured to acquire a deviation in a vehicle-width direction or a likelihood of a deviation in the vehicle-width direction of the vehicle with respect to the travel path by using a detecting device; and
an avoidance assistance unit configured to produce a notifying operation with respect to a steering input device of the steering system by driving the rotary electric machine or impart a deviation avoidance assistance steering force or a deviation avoidance assistance steering additive force with respect to the steering system, when the deviation acquisition unit has acquired the deviation in the vehicle-width direction or the likelihood of the deviation in the vehicle-width direction of the vehicle with respect to the travel path;
wherein the vehicle further comprises a rotational velocity acquisition unit configured to acquire a rotational velocity of the rotary electric machine;
the drive control device controls the left and right driving force difference by the driving device, based on the rotational velocity; and
furthermore, the drive control device prohibits or suppresses control of the left and right driving force difference based on the rotational velocity, when the deviation acquisition unit has acquired the deviation in the vehicle-width direction or the likelihood of the deviation in the vehicle-width direction of the vehicle with respect to the travel path, or when the avoidance assistance unit produces the notifying operation or imparts the deviation avoidance assistance steering force or the deviation avoidance assistance steering additive force.

2. The vehicle according to claim 1, wherein:
the steering system includes a steering amount acquisition unit configured to acquire a steering amount of a steering subject of the vehicle;
the rotary electric machine is arranged on a steering force transmission path more closely to the steered wheels than the steering amount acquisition unit; and
the steering force or the steering additive force is determined based on the steering amount.

3. The vehicle according to claim 1, wherein the driving device includes a left rotary electric machine connected mechanically to the left wheel, and a right rotary electric machine connected mechanically to the right wheel.

4. The vehicle according to claim 2, wherein the drive control device:
executes a steering amount proportional control configured to control the left and right driving force difference, based on the steering amount and a lateral acceleration of the vehicle;
controls the left and right driving force difference by combining the control of the left and right driving force difference based on the rotational velocity and the steering amount proportional control; and
prohibits or suppresses the control of the left and right driving force difference based on the rotational velocity and continues the control of the left and right driving force difference by the steering amount proportional control, when the deviation acquisition unit has acquired the deviation in the vehicle-width direction or the likelihood of the deviation in the vehicle-width direction of the vehicle with respect to the travel path, or when the avoidance assistance unit produces the notifying operation or imparts the deviation avoidance assistance steering force or the deviation avoidance assistance steering additive force.

5. The vehicle according to claim 1, wherein:
the avoidance assistance unit produces the notifying operation with respect to the steering input device of the steering system by driving the rotary electric machine, and thereafter, imparts the deviation avoidance assistance steering force or the deviation avoidance assistance steering additive force with respect to the steering system, when the deviation acquisition unit has acquired the deviation in the vehicle-width direction or the likelihood of the deviation in the vehicle-width direction of the vehicle with respect to the travel path; and
furthermore, the drive control device prohibits or suppresses the control of the left and right driving force difference based on the rotational velocity, when the deviation acquisition unit has acquired the deviation in the vehicle-width direction or the likelihood of the deviation in the vehicle-width direction of the vehicle with respect to the travel path, or when the avoidance assistance unit produces the notifying operation.

6. A vehicle comprising:
a driving device configured to control a torque of a left wheel and a torque of a right wheel, by controlling a left torque, which is a torque of a left rotary electric machine connected mechanically to the left wheel of the vehicle, and a right torque, which is a torque of a right rotary electric machine connected mechanically to the right wheel of the vehicle;
a drive control device configured to control the driving device;
a rotary electric machine connected mechanically to steered wheels and configured to impart a steering force or a steering additive force to a steering system including the steered wheels; and a driving assistance device configured to assist avoidance of a deviation of the vehicle with respect to a travel path;

wherein the driving assistance device includes an avoidance assistance unit configured to detect a deviation in a vehicle-width direction or a likelihood of a deviation in the vehicle-width direction of the vehicle with respect to the travel path by using a detecting device and configured to produce a notifying operation with respect to a steering input device of the steering system by driving the rotary electric machine or impart a deviation avoidance assistance steering force or a deviation avoidance assistance steering additive force with respect to the steering system, when there is the deviation in the vehicle-width direction or the likelihood of the deviation in the vehicle-width direction of the vehicle with respect to the travel path;

wherein the vehicle further comprises a rotational velocity acquisition unit configured to acquire a rotational velocity of the rotary electric machine;

the drive control device controls the left torque and the right torque, based on the rotational velocity; and furthermore, the drive control device prohibits or suppresses the control of the left torque and the right torque based on the rotational velocity, when there is the deviation in the vehicle-width direction or the likelihood of the deviation in the vehicle-width direction of the vehicle with respect to the travel path, or when the avoidance assistance unit produces the notifying operation or imparts the deviation avoidance assistance steering force or the deviation avoidance assistance steering additive force.

* * * * *